(12) United States Patent
Koyama et al.

(10) Patent No.: US 11,831,051 B2
(45) Date of Patent: *Nov. 28, 2023

(54) HYDROGEN-PRODUCING FUEL CELL SYSTEMS AND METHODS OF OPERATING HYDROGEN-PRODUCING FUEL CELL SYSTEMS FOR BACKUP POWER OPERATIONS

(71) Applicant: H2 PowerTech, LLC, Bend, OR (US)

(72) Inventors: Harol Koyama, Teton Village, WY (US); Michael Tyler Hicks, Bend, OR (US); Kevin C. Desrosiers, Bend, OR (US)

(73) Assignee: H2 PowerTech, LLC, Bend, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/727,589

(22) Filed: Apr. 22, 2022

(65) Prior Publication Data

US 2022/0246959 A1 Aug. 4, 2022

Related U.S. Application Data

(63) Continuation of application No. 17/323,927, filed on May 18, 2021, now Pat. No. 11,316,180.

(Continued)

(51) Int. Cl.
*H01M 8/04* (2016.01)
*H01M 8/24* (2016.01)
(Continued)

(52) U.S. Cl.
CPC ... *H01M 8/04302* (2016.02); *H01M 8/04753* (2013.01); *H01M 8/24* (2013.01)

(58) Field of Classification Search
CPC .................................................. H01M 8/04302
See application file for complete search history.

(56) References Cited

U.S. PATENT DOCUMENTS 2,824,620 A 2/1958 Rosset
3,336,730 A 8/1967 McBride et al.
(Continued)

FOREIGN PATENT DOCUMENTS

DE 10237154 3/2004
EP 1065741 A2 1/2001
(Continued)

OTHER PUBLICATIONS

English abstract of Japanese Patent No. 6176779, 1994.
(Continued)

*Primary Examiner* — Brian R Ohara
(74) *Attorney, Agent, or Firm* — KOLITCH ROMANO DASCENZO GATES LLC

(57) ABSTRACT

Hydrogen-producing fuel cell systems (HPFCS) and methods. The HPFCS includes a fuel processor configured to produce generated hydrogen gas, a hydrogen storage device configured to contain stored hydrogen gas, and a fuel cell stack configured to produce an initial electrical output from the stored hydrogen gas and an oxidant and to produce a subsequent electrical output from the generated hydrogen gas and the oxidant. The methods include detecting an inability of a primary power source to satisfy an applied load. Responsive to the detecting, the methods include initiating a startup of the fuel processor, supplying stored hydrogen gas to the fuel cell stack to produce the initial electrical output, satisfying the applied load with the initial electrical output, supplying generated hydrogen gas to the fuel cell stack after the startup to produce a subsequent electrical output, and satisfying the applied load with the subsequent electrical output.

23 Claims, 2 Drawing Sheets

Related U.S. Application Data

(60) Provisional application No. 63/028,315, filed on May 21, 2020.

(51) Int. Cl.
*H01M 8/04302* (2016.01)
*H01M 8/04746* (2016.01)

(56) References Cited

U.S. PATENT DOCUMENTS

| | | | |
|---|---|---|---|
| 3,338,681 A | 8/1967 | Kordesch | |
| 3,350,176 A | 10/1967 | Green et al. | |
| 3,469,944 A | 9/1969 | Bocard et al. | |
| 3,522,019 A | 7/1970 | Buswell et al. | |
| 3,655,448 A | 4/1972 | Setzer | |
| 3,857,735 A | 12/1974 | Louis et al. | |
| 3,980,452 A | 9/1976 | Krumm et al. | |
| 4,098,959 A | 7/1978 | Fanciullo | |
| 4,098,960 A | 7/1978 | Gagnon | |
| 4,175,165 A | 11/1979 | Adlhart | |
| 4,214,969 A | 7/1980 | Lawrance | |
| 4,238,403 A | 12/1980 | Pinto | |
| 4,349,613 A | 9/1982 | Winsel | |
| 4,381,641 A | 5/1983 | Madgavkar et al. | |
| 4,468,235 A | 8/1984 | Hill | |
| 4,522,894 A | 6/1985 | Hwang et al. | |
| 4,533,607 A | 8/1985 | Sederquist | |
| 4,567,857 A | 2/1986 | Houseman et al. | |
| 4,583,583 A | 4/1986 | Wittel | |
| 4,642,273 A | 2/1987 | Sasaki | |
| 4,644,751 A | 2/1987 | Hsu | |
| 4,650,814 A | 3/1987 | Keller | |
| 4,657,828 A | 4/1987 | Tajima | |
| 4,659,634 A | 4/1987 | Struthers | |
| 4,670,359 A | 6/1987 | Beshty et al. | |
| 4,781,241 A | 11/1988 | Misage et al. | |
| 4,946,667 A | 8/1990 | Beshty | |
| 4,988,580 A | 1/1991 | Ohsaki et al. | |
| 5,141,823 A | 8/1992 | Wright et al. | |
| 5,200,278 A | 4/1993 | Watkins et al. | |
| 5,229,222 A | 7/1993 | Tsutsumi et al. | |
| 5,335,628 A | 8/1994 | Dunbar | |
| 5,366,818 A | 11/1994 | Wilkinson et al. | |
| 5,366,821 A | 11/1994 | Merritt et al. | |
| 5,401,589 A | 3/1995 | Palmer et al. | |
| 5,417,051 A | 5/1995 | Ankersmit et al. | |
| RE35,002 E | 7/1995 | Matsubara et al. | |
| 5,432,710 A | 7/1995 | Ishimaru et al. | |
| 5,527,632 A | 6/1996 | Gardner | |
| 5,637,414 A | 6/1997 | Inoue et al. | |
| 5,658,681 A | 8/1997 | Sato et al. | |
| 5,677,073 A | 10/1997 | Kawatsu | |
| 5,771,476 A | 6/1998 | Mufford et al. | |
| 5,795,666 A | 8/1998 | Johnssen | |
| 5,798,186 A | 8/1998 | Fletcher et al. | |
| 5,833,723 A | 11/1998 | Kuwabara et al. | |
| 5,861,137 A | 1/1999 | Edlund | |
| 5,897,970 A | 4/1999 | Isomura et al. | |
| 5,900,031 A | 5/1999 | Bloomfield | |
| 5,985,474 A | 11/1999 | Chen et al. | |
| 5,991,670 A | 11/1999 | Mufford et al. | |
| 5,997,594 A | 12/1999 | Edlund et al. | |
| 6,007,931 A | 12/1999 | Fuller et al. | |
| 6,083,637 A | 7/2000 | Walz et al. | |
| 6,103,410 A | 8/2000 | Fuller et al. | |
| 6,103,411 A | 8/2000 | Matsubayashi et al. | |
| 6,165,633 A | 12/2000 | Negishi | |
| 6,221,117 B1 | 4/2001 | Edlund et al. | |
| 6,319,306 B1 | 11/2001 | Edlund et al. | |
| 6,368,735 B1 | 4/2002 | Lomax et al. | |
| 6,376,113 B1 | 4/2002 | Edlund et al. | |
| 6,383,670 B1 | 5/2002 | Edlund et al. | |
| 6,395,405 B1 | 5/2002 | Buxbaum | |
| 6,465,118 B1 | 10/2002 | Dickman et al. | |
| 6,494,937 B1 | 12/2002 | Edlund et al. | |
| 6,495,277 B1 | 12/2002 | Edlund et al. | |
| 6,522,955 B1 | 2/2003 | Colborn | |
| 6,562,111 B2 | 5/2003 | Edlund et al. | |
| 6,666,961 B1 | 12/2003 | Skoczylas et al. | |
| 6,686,078 B1 | 2/2004 | Jones | |
| 6,926,748 B2 | 8/2005 | Goebel et al. | |
| 7,198,862 B2 | 4/2007 | Baumann et al. | |
| 7,659,019 B2 | 2/2010 | Edlund | |
| 7,972,420 B2 | 7/2011 | Pledger et al. | |
| 10,476,093 B2 | 11/2019 | Hill et al. | |
| 2002/0041986 A1 | 4/2002 | Wojtowicz et al. | |
| 2002/0059753 A1 | 5/2002 | Ichikawa | |
| 2002/0114984 A1 | 8/2002 | Edlund et al. | |
| 2003/0019156 A1 | 1/2003 | Takimoto et al. | |
| 2003/0072977 A1 | 4/2003 | Speranza et al. | |
| 2003/0198844 A1 | 10/2003 | Ukai et al. | |
| 2004/0191591 A1 | 9/2004 | Yamamoto | |
| 2004/0247961 A1 | 12/2004 | Edlund | |
| 2005/0136311 A1 | 6/2005 | Ueda et al. | |
| 2005/0186455 A1 | 8/2005 | Kaye et al. | |
| 2007/0042233 A1 | 2/2007 | Lyman et al. | |
| 2008/0171239 A1 | 7/2008 | Tucker et al. | |
| 2011/0129745 A1 | 6/2011 | Givens et al. | |
| 2011/0212375 A1 | 9/2011 | Taguchi et al. | |
| 2011/0256459 A1 | 10/2011 | Edlund | |

FOREIGN PATENT DOCUMENTS

| | | |
|---|---|---|
| GB | 1037423 | 5/1963 |
| JP | 57145276 | 9/1982 |
| JP | 61-82678 | 4/1986 |
| JP | 4-163860 | 6/1992 |
| JP | 4-338101 | 11/1992 |
| JP | H09-147897 | 6/1997 |
| JP | H09-245825 | 9/1997 |
| JP | 9-306531 | 11/1997 |
| JP | 2002-255510 | 9/2002 |
| JP | 2003-22836 | 1/2003 |
| JP | 2003-203658 | 7/2003 |
| JP | 2003-288929 | 10/2003 |
| JP | 2004-158333 | 6/2004 |
| JP | 2004-182528 | 7/2004 |
| JP | 2005-44572 | 2/2005 |
| JP | 2005-071970 | 3/2005 |
| JP | 2005-228583 | 2/2006 |
| JP | 6176779 | 7/2017 |
| TW | I668939 B | 8/2019 |
| WO | WO 2000/02282 | 1/2000 |
| WO | WO 2000/04600 | 1/2000 |
| WO | WO 2002/076883 | 10/2002 |
| WO | WO 2003/089128 | 10/2003 |
| WO | WO 2016/178849 | 11/2016 |

OTHER PUBLICATIONS

English abstract of Japanese Patent No. 57-145276.
English abstract of Japanese Patent No. 4-163860.
English abstract of Japanese Patent No. 4-338101.
Jørgensen, S. Lægsgaard, et al., "Application of Pd-Membranes for the Production of Pure Hydrogen in Methanol-Based Fuel Cell Powered Vehicles," Proceedings of Fourth Workshop: Optimisation of Catalytic Membrane Reactor Systems, ESF Network, Catalytic Membrane Reactors, Oslo, Norway, pp. 51-57 (May 30-31, 1997).
Yang, Ralph T., "Gas Separation by Adsorption Processes," pp. 253-260, Butterworth Publishers, 1987.
English-language abstract of JP9-306531, 1997.
English-language abstract of Japanese Patent No. 5147902, Jun. 1993.
English-language abstract of Japanese Patent No. 7057758, Mar. 1995.
English-language abstract of Japanese Patent No. 8-287932, Nov. 1996.
English-language abstract of German language PCT Patent Publication No. WO 00/04600, Jan. 2000.
Amphlett, J. C., et al., "Simulation of a 250 kW Diesel Fuel Processor/PEM Fuel Cell System," Fifth Grove Fuel Cell Sympo-

(56) References Cited

OTHER PUBLICATIONS sium, Commonwealth Institute, London, U.K., p. 8 (Sep. 22-25, 1997).

Edlund, David J. and William A. Pledger, "The Practical Use of Metal-Membrane Reactors for Industrial Applications," The 1995 Membrane Technology Reviews, pp. 89-97 (Nov. 1994).

English-language abstract of Japanese Patent Publication No. 2005-228583, Aug. 25, 2005.

English-language abstract of Japanese Patent Publication No. 2005-44572, Feb. 17, 2005.

English-language abstract of Japanese Patent Publication No. 2003-203658, Jul. 18, 2003.

English-language abstract of Japanese Patent Publication No. 2003-22836, Jan. 24, 2003.

English-language abstract of Japanese Patent Publication No. 61-82678, Apr. 26, 1986.

English-language abstract of Japanese Patent Publication No. H09-245825, Sep. 19, 1997.

English-language abstract of Japanese Patent Publication No. 2002-255510, Sep. 11, 2002.

English-language abstract of Japanese Patent Publication No. 2003-288929, Oct. 10, 2003.

English-language abstract of Japanese Patent Publication No. 2004-182528, Jul. 2, 2004.

English-language abstract of Japanese Publication No. H09-147897, Jun. 6, 1997.

English-language abstract of Japanese Publication No. 2005-071970, Mar. 17, 2005.

English-language abstract of Japanese Publication No. 2004-158333, Jun. 3, 2004.

English-language abstract of DE10237154, 2004.

English-language abstract of Taiwan Patent No. I668939 B, Aug. 2019.

HYDROGEN-PRODUCING FUEL CELL SYSTEMS AND METHODS OF OPERATING HYDROGEN-PRODUCING FUEL CELL SYSTEMS FOR BACKUP POWER OPERATIONS

RELATED APPLICATIONS

This application is a continuation of and claims priority to U.S. patent application Ser. No. 17/323,927, which was filed on May 18, 2021, and issued as U.S. Pat. No. 11,316,180 on Apr. 26, 2022, and which claims priority to similarly titled U.S. Provisional Patent Application No. 63/028,315, which was filed on May 21, 2020. The complete disclosures of these related applications are hereby incorporated by reference.

FIELD OF THE DISCLOSURE

The present disclosure relates generally to hydrogen-producing fuel cell systems that are configured for backup power applications and to methods of operating hydrogen-producing fuel cell systems that are utilized for backup power applications.

BACKGROUND OF THE DISCLOSURE

Hydrogen-producing fuel cell systems generally include a fuel processor, which may be utilized to generate hydrogen gas from a carbon-containing feedstock, and a fuel cell stack, which may be utilized to generate an electrical output from the hydrogen gas. Hydrogen-producing fuel cell systems may be utilized in backup power applications. In such configurations, the hydrogen-producing fuel cell systems generally are configured to generate the electrical output to satisfy an applied load from an energy-consuming device when a primary power source is unable to satisfy the applied load.

Once it is determined that the hydrogen-producing fuel cell system is needed to satisfy the applied load, it takes a finite startup time for the fuel processor to begin to generate at least a minimum threshold amount of hydrogen gas to enable the fuel cell stack to produce a sufficient electrical output to satisfy the applied load. This finite startup time may, as examples, be based upon a time needed to heat the fuel processor to a hydrogen-producing temperature range and/or upon a time needed by the fuel processor to generate the hydrogen gas needed by the fuel cell stack to produce the electrical output to satisfy the applied load.

Conventionally, batteries, or battery banks, may be utilized to satisfy the applied load during this finite startup time, and the required storage capacity for the batteries may be based upon both a magnitude of the applied load and a duration of the finite startup time. Batteries are expensive, are maintenance-intensive, and often are stolen from remote installations. As such, it may be desirable to decrease the finite startup time of the fuel cell system, thereby permitting a decrease in the needed storage capacity for the batteries and/or permitting elimination of the batteries. Thus, there exists a need for improved hydrogen-producing fuel cell systems and methods of operating hydrogen-producing fuel cell systems for backup power applications.

SUMMARY OF THE DISCLOSURE

Hydrogen-producing fuel cell systems configured for backup power applications are disclosed herein, as are methods of operating hydrogen-producing fuel cell systems for backup power operations. The hydrogen-producing fuel cell systems (HPFCS) include a fuel processor, a hydrogen storage device, and a fuel cell stack. The fuel processor is configured to receive one or more feed streams and to react the one or more feed streams to produce generated hydrogen gas. The hydrogen storage device is configured to store a volume of stored hydrogen gas. The fuel cell stack is configured to receive an oxidant and hydrogen gas and to generate an electrical output from the oxidant and the hydrogen gas. The fuel cell stack is configured to at least partially satisfy an applied load with the electrical output when a primary power source that normally is adapted to satisfy the applied load is not providing a primary electrical output to satisfy the applied load. The HPFCS is configured to detect an inability of the primary power source to satisfy the applied load. Responsive to a detection of the inability of the primary power source to satisfy the applied load, the HPFCS is configured to initiate a startup of the fuel processor, supply the stored hydrogen gas to the fuel cell stack to produce an initial electrical output from the stored hydrogen gas during the startup of the fuel processor, and at least partially satisfy the applied load with the initial electrical output. When the fuel processor reaches a hydrogen-producing state from the startup, the HPFCS is configured to supply the generated hydrogen gas to the fuel cell stack to produce a subsequent electrical output and at least partially satisfy the applied load with the subsequent electrical output.

The methods include detecting an inability of the primary power source to satisfy the applied load. Responsive to the detecting, the methods include initiating supply of stored hydrogen gas from the hydrogen storage device to the fuel cell stack, consuming the stored hydrogen gas with the fuel cell stack to produce an initial electrical output from the fuel cell stack, and at least partially satisfying the applied load with the initial electrical output. The methods further include initiating a startup of the fuel processor. Subsequent to at least a threshold startup time of the fuel processor, the methods include initiating supply of the generated hydrogen gas from the fuel processor to the fuel cell stack, consuming the generated hydrogen gas with the fuel cell stack to produce a subsequent electrical output from the fuel cell stack, and at least partially satisfying the applied load with the subsequent electrical output.

DETAILED DESCRIPTION AND BEST MODE OF THE DISCLOSURE

Figure 1:
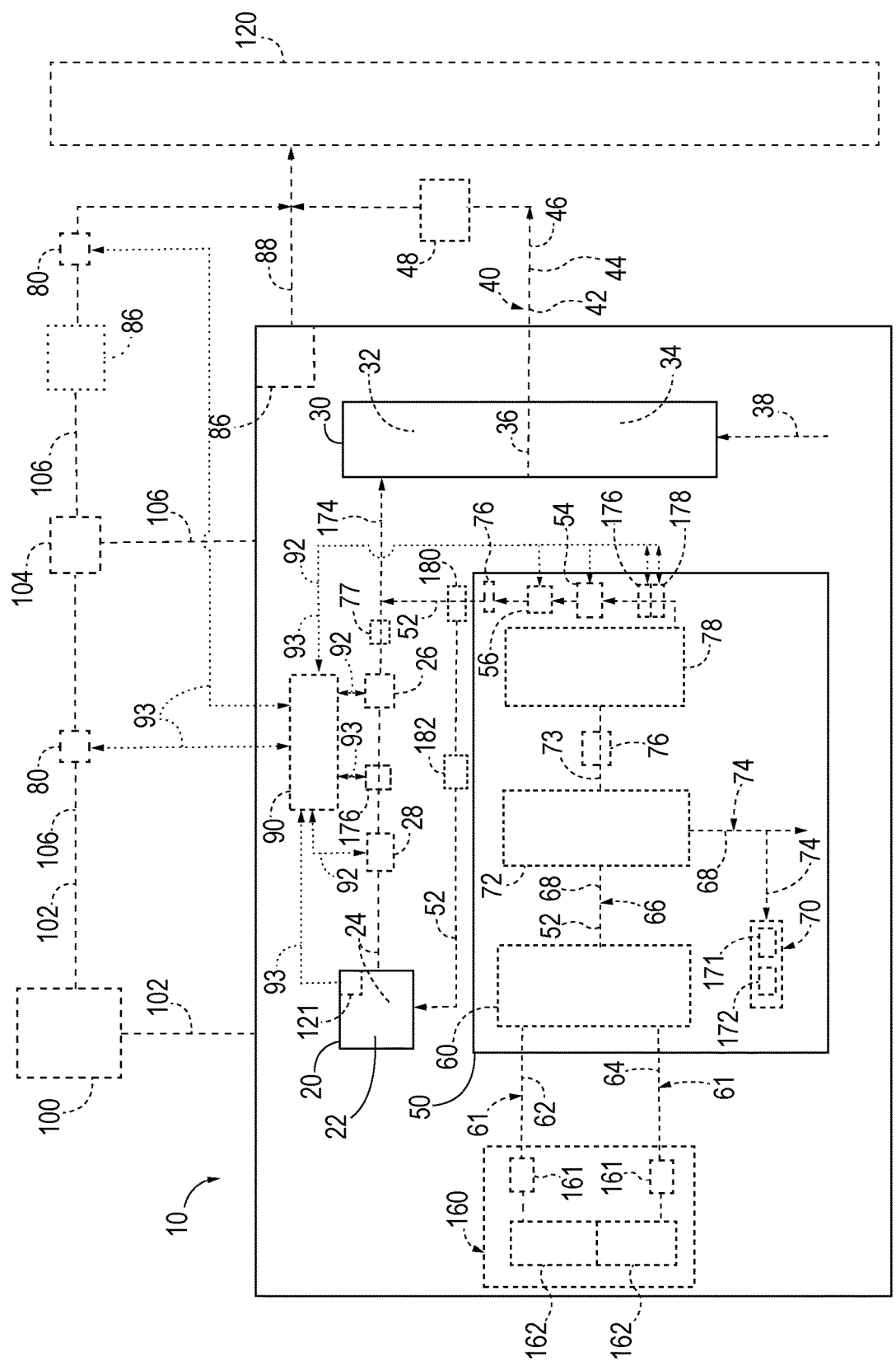
FIG. 1 is a schematic illustration of examples of hydrogen-producing fuel cell systems according to the present disclosure.
Figure 2:
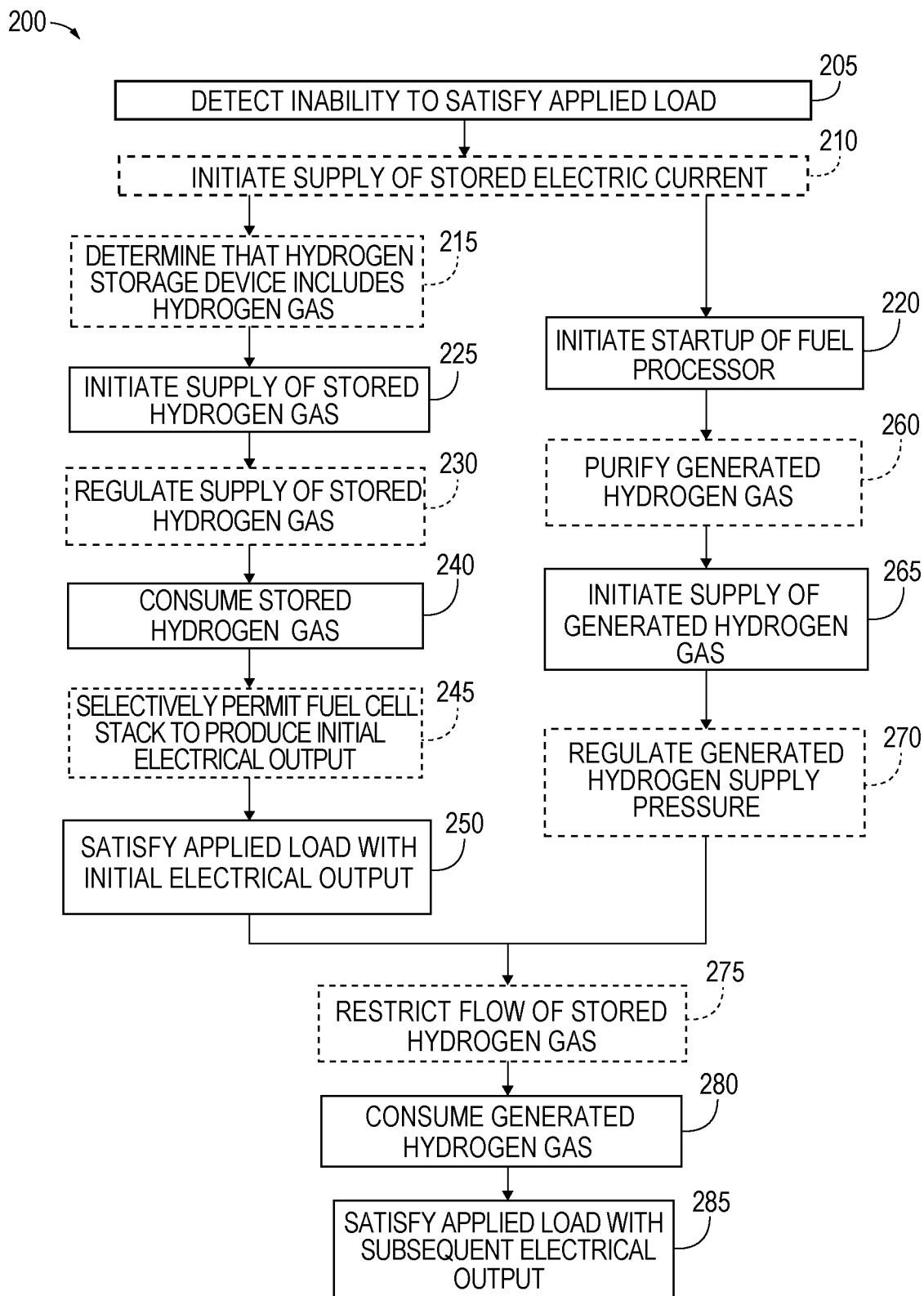
FIG. 2 is a flowchart depicting examples of methods of operating a hydrogen-producing fuel cell system according to the present disclosure.

FIGS. 1-2 provide examples of hydrogen-producing fuel cell systems 10 and/or of methods 200, according to the present disclosure. Elements that serve a similar, or at least substantially similar, purpose are labeled with like numbers in each of FIGS. 1-2, and these elements may not be discussed in detail herein with reference to each of FIGS. 1-2. Similarly, all elements may not be labeled in each of FIGS. 1-2, but reference numerals associated therewith may be utilized herein for consistency. Elements, components, and/or features that are discussed herein with reference to one or more of FIGS. 1-2 may be included in and/or utilized with any of FIGS. 1-2 without departing from the scope of the present disclosure.

In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure. Dotted lines may be utilized to indicate information and/or communication connections.

FIG. 1 is a schematic illustration of examples of hydrogen-producing fuel cell systems (HPFCS) 10 according to the present disclosure. As illustrated in solid lines in FIG. 1, hydrogen-producing fuel cell systems 10 include a hydrogen storage device 20, a fuel cell stack 30, and a fuel processor 50. Fuel processor 50 is configured to receive one or more feed streams 61, examples of which include a carbon-containing feedstock 62 and water 64. Fuel processor 50 includes a reforming region 60, in which the one or more feed streams 61 are reacted to produce and/or generate a mixed gas stream 66 that includes generated hydrogen gas 52 and that also may include other gasses 68. At least a fraction of mixed gas stream 66, such as generated hydrogen gas 52, may be provided, or selectively provided, to fuel cell stack 30. Examples of carbon-containing feedstock 62 include one or more alcohols or hydrocarbons, with methanol being a specific example. Water 64 may be delivered to the fuel processor as a liquid or steam. When the carbon-containing feedstock and/or water are delivered to the fuel processor in liquid form, they typically will be vaporized in or prior to delivery to reforming region 60. Fuel processor 50 additionally or alternatively may be referred to as a fuel processing system 50, a hydrogen generator 50, a hydrogen-producing assembly 50, a steam reformer 50, and/or a fuel reformer 50.

As shown in FIG. 1, fuel processor 50 also may include a purification assembly 72. Purification assembly 72 is configured to receive mixed gas stream 66 from reforming region 60 and to separate mixed gas stream 66 into a purified hydrogen stream 73 and a byproduct stream 74. Purified hydrogen stream 73 includes a greater concentration of hydrogen gas than mixed gas stream 66, and purified hydrogen stream 73 contains a lower concentration of other gasses 68 than mixed gas stream 66. Purified hydrogen stream 73 may contain pure or at least substantially pure hydrogen gas. The hydrogen gas contained in purified hydrogen stream 73 is, consists of, or consists essentially of, generated hydrogen gas 52. As used herein, at least substantially pure hydrogen gas may be greater than 90% pure, greater than 95% pure, greater than 99% pure, greater than 99.5% pure, and/or greater than 99.9% pure. In contrast, byproduct stream 74 contains a greater overall concentration of the other gasses than the mixed gas stream. Byproduct stream 74 may contain hydrogen gas, but it contains a lower concentration of hydrogen gas than the mixed gas stream.

More specific examples of purification assemblies 72 that may be included in and/or utilized with fuel processor 50 are provided herein. HPFCS 10 may be configured to selectively deliver purified hydrogen stream 73 from purification assembly 72 to fuel cell stack 30. HPFCS 10 also may be configured to expel byproduct stream 74 from HPFCS 10, store byproduct stream 74, and/or utilize byproduct stream 74 such as in a manner discussed herein.

Hydrogen storage device 20 is configured to store a volume 22 of hydrogen gas and to selectively provide this stored hydrogen gas to fuel cell stack 30. As used herein, hydrogen gas that is, or was, stored in hydrogen storage device 20 may be referred to as stored hydrogen gas 24. Fuel cell stack 30 reacts hydrogen gas, such as stored hydrogen gas 24 and/or generated hydrogen gas 52, with an oxidant 38 to produce and/or generate an electrical output 40. Electrical output 40 also may be referred to herein as a stack electrical output 40 and may be provided to a DC/DC converter 48 prior to being provided to an applied load, which may be at least in part from energy-consuming device 120. DC/DC converter 48 may change a voltage of stack electrical output 40, such as from a voltage that is produced by fuel cell stack 30 to a voltage that energy-consuming device 120 is configured to receive and/or to utilize. As an example, DC/DC converter 48 may be a buck, or step-down, converter that decreases the voltage of stack electrical output 40, or DC/DC converter 48 may be a boost converter that increases the voltage of stack electrical output 40.

For convenience, the present disclosure will refer to HPFCS 10 as including a fuel cell stack 30. However, it is within the scope of the present disclosure that HPFCS 10 may include any suitable number of fuel cell stacks 30, such as at least one fuel cell stack 30 and/or a plurality of fuel cell stacks 30.

As discussed, HPFCS 10 is configured to utilize electrical output 40 from fuel cell stack 30 to at least partially satisfy an applied load when a primary power source 100 that normally is adapted to satisfy the applied load is not providing a primary electrical output 102 to satisfy the applied load. The applied load may be, at least in part, from an energy-consuming device 120. As such, HPFCS 10 may be utilized to selectively power, or to provide backup power to, energy-consuming device 120. The applied load also may be from one or more components, assemblies, actuators, and/or electrically-powered elements of HPFCS 10, such as discussed in more detail herein. For convenience, the present disclosure will refer to the applied load as being at least in part from an energy-consuming device 120. However, it is within the scope of the present disclosure that the applied load also may be, at least in part, from a plurality of energy-consuming devices 120, in which case HPFCS 10 may be described as being utilized to selectively power, or provide backup power to, a plurality of energy-consuming devices 120.

As discussed in more detail herein, primary power source 100 may be configured to provide an alternating current (AC) primary electrical output 102 or a direct current (DC) primary electrical output 106. In examples in which primary power source 100 is configured to provide the DC primary electrical output, the DC primary electrical output may be provided directly to energy-consuming device 120. In examples in which primary power source 100 is configured to provide the AC primary electrical output 102, a rectifier 104 may be utilized to rectify the primary electrical output to produce and/or generate DC primary electrical output 106 prior to supply to, and/or consumption by, energy-consuming device 120.

Primary power source 100 additionally or alternatively may be utilized to provide power to at least a portion of HPFCS 10, such as to power the hydrogen-producing fuel cell system, or at least portions thereof, during periods in which the primary power source is available to do so. In some examples, such as when the primary power source is configured to provide the DC primary electrical output, the primary electrical output may be provided directly to HPFCS 10. In some examples, such as when the primary power source is configured to provide the AC primary electrical output, rectifier 104 may be utilized to generate DC primary electrical output 106, which may be provided to the HPFCS.

Primary power source 100 may not always be available to reliably provide primary electrical output 102, such as to satisfy the applied load from one or more energy-consuming devices 102 and/or HPFCS 10. For example, primary power source 100 may be unreliable and/or subject to interruption. In addition, some energy-consuming devices 102 require a constant or nearly constant supply of electrical output, and it is prudent to provide backup protection even if the primary power source traditionally has been a reliable source of primary electrical output 102. In these and other scenarios, and as discussed in more detail herein with reference to methods 200 of FIG. 2, HPFCS 10 may be configured to detect that primary power source 100 is unable to satisfy the applied load. As an example, HPFCS 10 may include and/or be in communication with a primary power detector 80, which may be utilized to detect that the primary power source is unable to satisfy the applied load. In FIG. 1, examples of suitable locations for primary power detector 80 are illustrated, such as to directly monitor the primary electrical output from the primary power source and/or to monitor the state-of-charge and/or bus voltage of energy storage device 86. For brevity, a detection by HPFCS 10 of the inability of primary power source 100 to satisfy the applied load also may be referred to herein as a primary power source lapse detection.

Responsive to the detection of the inability of primary power source 100 to satisfy the applied load, HPFCS 10 is configured to provide electrical output 40 to the applied load and to at least partially, or completely, satisfy the applied load with electrical output 40. More specifically, responsive to the primary power source lapse detection, HPFCS 10 is configured to initiate a startup of fuel processor 50. As used herein, startup of fuel processor 50 additionally or alternatively may be referred to as a startup sequence, a startup process, and/or a startup routine of fuel processor 50. During the startup of fuel processor 50, HPFCS may be configured to supply stored hydrogen gas 24 from hydrogen storage device 20 to fuel cell stack 30 to produce an initial electrical output 42 from the stored hydrogen gas 24, and at least partially satisfy, and optionally completely satisfy, the applied load with initial electrical output 42. When fuel processor 50 reaches a hydrogen-producing state from the startup, HPFCS 10 is configured to supply generated hydrogen gas 52 from fuel processor 50 to fuel cell stack 30 to produce a subsequent electrical output 46 from generated hydrogen gas 52 and to at least partially satisfy the applied load with the subsequent electrical output 46. As discussed in more detail herein, when generated hydrogen gas 52 is the only hydrogen gas supplied to fuel cell stack 30, HPFCS 10 may be configured to satisfy, or completely satisfy, the applied load with subsequent electrical output 46.

As referred to herein, initial electrical output 42 is the electrical output 40 produced by fuel cell stack 30 by reacting stored hydrogen gas 24 with oxidant 38, and subsequent electrical output 46 is the electrical output 40 produced by fuel cell stack 30 by reacting generated hydrogen gas 52 with oxidant 38. Thus, expressed in slightly different terms, responsive to the detection of the inability of primary power source 100 to satisfy the applied load, HPFCS 10 is configured to initiate startup of fuel processor 50, utilize stored hydrogen gas 24 to at least partially satisfy the applied load while the fuel processor 50 is in startup, and utilize generated hydrogen gas 52 produced by fuel processor 50 to at least partially satisfy the applied load once the startup of fuel processor 50 has been completed.

In the present disclosure, when a particular electrical output (e.g., initial electrical output 42 or subsequent electrical output 46) is described as being utilized to "at least partially satisfy the applied load," this may include the particular electrical output being utilized to satisfy a portion of the applied load or to satisfy the entirety of the applied load. For examples in which the particular electrical output is utilized to satisfy a portion of the applied load, HPFCS 10 may utilize an additional electrical output or electrical current source to satisfy the remaining portion of the applied load. In this way, for examples in which the particular electrical output is utilized to satisfy a portion of the applied load, HPFCS 10 may satisfy, or completely satisfy, the applied load with a combination of the particular electrical output and the additional electrical output or electrical current source. In other words, a particular electrical output being described herein as being utilized to "at least partially satisfy the applied load" does not necessarily mean that the applied load is required to be only at least partially satisfied, but rather that the particular electrical output is utilized to satisfy a portion of, and optionally the entirety of, the applied load, with any remaining portion of the applied load optionally being satisfied with the additional electrical output or electrical current source.

For example, as discussed in more detail herein, HPFCS 10 may include, or otherwise be associated with, an electrical energy storage device 86. Electrical energy storage device 86 is configured to store electrical energy and provide, or selectively provide, a stored electrical current 88 utilizing the stored electrical energy. As examples, the electrical energy storage device may be configured to store the electrical energy in a stored energy form, such as chemical energy, as rotational energy, and/or in an electric field, selectively convert the stored energy form into electrical energy, and provide, or selectively provide, the electrical energy as stored electrical current 88. Thus, references to stored electrical current 88 in the present disclosure refer to electrical current that is provided from electrical energy storage device 86, such as by electrical energy storage device 86 utilizing or releasing the electrical energy stored therein and/or by electrical energy storage device 86 converting a stored energy form stored therein into electrical energy. Stored electrical current 88 additionally or alternatively may be referred to herein as backup electrical current 88, bridging electrical current 88, supplemental electrical current 88, and/or released electrical current 88. For some examples in which HPFCS 10 utilizes initial electrical output 42 to satisfy a portion of the applied load (i.e., partially satisfy the applied load), HPFCS 10 may be configured to utilize stored electrical current 88 from electrical energy storage device 86 to satisfy the remaining portion of the applied load with stored electrical current 88. As such, HPFCS may be configured to completely satisfy the applied load with a combination of initial electrical output 42 and stored electrical current 88.

As another example, generated hydrogen gas 52 and stored hydrogen gas 24 may be supplied to fuel cell stack 30 simultaneously with one another, or as a mixture, for a relatively short period of time after initiation of the supply of generated hydrogen gas 52 to fuel cell stack 30. As examples, generated hydrogen gas 52 and stored hydrogen gas 24 may be supplied to fuel cell stack 30 through a common conduit. Stored hydrogen gas 24 may be present in the common conduit during initiation of the supply of generated hydrogen gas 52 to fuel cell stack 30. In such examples, generated hydrogen gas 52 may mix with the stored hydrogen gas 24 in the common conduit such that a mixture of generated hydrogen gas 52 and stored hydrogen gas 24 is supplied to fuel cell stack 30 during a relatively short or transitional time period. In such examples, HPFCS 10 may be described as producing from this mixture an intermediate electrical output 44 that includes initial electrical output 42 and subsequent electrical output 46. In some such examples, HPFCS 10 is configured to satisfy, or completely satisfy, the applied load with intermediate electrical output 44. In other words, HPFCS 10 may satisfy a portion of the applied load with initial electrical output 42 and satisfy the remaining portion of the applied load with subsequent electrical output 46 during this short or transitional time period in which both generated hydrogen gas 52 and stored hydrogen gas 24 are supplied to fuel cell stack 30. To initiate the startup of fuel processor 50, HPFCS 10 may be configured to supply the one or more feed streams 61 to fuel processor 50, and the fuel processor 50 may begin to produce mixed gas stream 66, which includes generated hydrogen gas 52, from feed stream(s) 61. In particular, as shown in FIG. 1, HPFCS 10 may include a feedstock delivery system 160 that is configured to supply feed stream(s) 61 to fuel processor 50. Feedstock delivery system 160 may include one or more feed stream pumps 161 that are utilized to selectively deliver feed streams 61 to fuel processor 50 from one or more feed stream supplies 162 that contain a volume of feed stream(s) 61. Feed stream pumps 161 may be electrically powered, and thus may form a portion of the applied load. As such, HPFCS 10 may be configured to provide electrical power to feed stream pumps 161 to initiate the startup of the fuel processor 50, such as discussed in more detail herein.

Typically, in order for reforming region 60 to produce generated hydrogen gas 52 from feed stream(s) 61 efficiently, reforming region 60 is heated to within, and maintained within, a hydrogen-producing temperature range. More specific examples of the hydrogen-producing temperature range are provided herein. When reforming region 60 is operated at a temperature below the hydrogen-producing temperature range, reforming region 60 may produce mixed gas stream 66 with a greater proportion of other gasses 68 and a smaller proportion of generated hydrogen gas 52 than when reforming region 60 is operated within the hydrogen-producing temperature range. Thus, HPFCS 10 may be configured to heat reforming region 60 to within, and/or maintain reforming region 60 within, the hydrogen-producing temperature range during the startup of fuel processor 50.

With this in mind, as shown in FIG. 1, HPFCS 10 may include a heating assembly 70 that is configured to heat at least reforming region 60 of fuel processor 50 to within, and/or maintain reforming region 60 within, the hydrogen-producing temperature range. More specific examples of heating assemblies 70 are provided herein. Heating assembly 70 also may be configured and/or utilized to selectively heat and/or maintain the temperature of one or more additional components of HPFCS 10, such as purification assembly 72, within one or more respective operational temperature ranges.

In some examples, fuel processor 50 is a thermally primed fuel processor 50, in which HPFCS 10 utilizes heating assembly 70 to maintain fuel processor 50 and/or reforming region 60 in a thermally primed state while primary power source 100 satisfies the applied load, while fuel processor 50 is not receiving feed stream(s) 61, and/or prior to initiating startup of fuel processor 50. More specifically, to maintain fuel processor 50 in the thermally primed state, HPFCS 10 may utilize heating assembly 70 to maintain fuel processor 50 and/or reforming region 60 at or above a thermally primed temperature and/or within a thermally primed temperature range that is greater than ambient temperature and/or within a threshold fraction of the hydrogen-producing temperature range. As such, when fuel processor 50 is a thermally primed fuel processor 50, fuel processor 50 and/or reforming region 60 may be heated through a smaller temperature increase to within the hydrogen-producing temperature range during the startup. Thus, the time required to startup the thermally primed fuel processor may be less than that required for a fuel processor that is not thermally primed or for a fuel processor that is maintained at ambient temperature prior to the startup.

As shown in FIG. 1, heating assembly 70 may include a burner assembly 171 that is configured to combust a fuel source to heat fuel processor 50 and/or reforming region 60. In some examples, HPFCS 10 is configured to supply byproduct stream 74 from purification assembly 72 to burner assembly 171, and burner assembly 171 combusts the byproduct stream to heat fuel processor 50 and/or reforming region 60. Thus, HPFCS 10 may utilize burner assembly 171 to heat fuel processor 50 and/or reforming region 60 during the startup of fuel processor 50 and/or while fuel processor 50 is receiving feed stream(s) 61. Heating assembly 70 additionally or alternatively may include an electrical heating assembly 172 that is configured to receive electrical power, such as from primary power source 100 and/or a battery or other electrical energy storage device, and to heat fuel processor 50 and/or reforming region 60 utilizing the electrical power. Thus, electrical heating assembly 172 may form a portion of the applied load. In particular, HPFCS may utilize electrical heating assembly 172 to maintain fuel processor 50 and/or reforming region 60 in the thermally primed state, such as prior to the startup of fuel processor 50.

As mentioned, during startup, reforming region 60 may produce generated hydrogen gas 52 as a portion of mixed gas stream 66, which in turn may be delivered to purification assembly 72 and separated by purification assembly 72 into byproduct stream 74 and purified hydrogen stream 73, which includes the generated hydrogen gas. However, during the startup of fuel processor 50, the pressure and/or flow rate at which reforming region 60 produces generated hydrogen gas 52 may not be sufficient to satisfy the applied load. Additionally or alternatively, the pressure and/or flow rate at which fuel processor 50 produces purified hydrogen stream 73 may not be sufficient to satisfy the applied load. In other words, fuel processor 50 may produce generated hydrogen gas 52 during startup at a pressure and/or flow rate that is lower than a hydrogen gas pressure and/or hydrogen flow rate required by fuel cell stack 30 to produce an electrical output 40 that is sufficient to satisfy the applied load.

However, the pressure and/or flow rate at which fuel processor 50 produces generated hydrogen gas 52 may increase during startup to become sufficient to satisfy the applied load. Thus, fuel processor 50 may reach the hydrogen-producing state when fuel processor 50 produces, and/or stably produces, generated hydrogen gas 52 with a generated hydrogen gas supply pressure that is sufficient for fuel cell stack 30 to generate a sufficient electrical output 40 to satisfy the applied load. Such a generated hydrogen gas supply pressure may be referred to herein as a threshold minimum hydrogen gas supply pressure. Additionally or alternatively, fuel processor 50 may reach the hydrogen-producing state when fuel processor 50 produces generated hydrogen gas 52 with a generated hydrogen gas flow rate that is sufficient for fuel cell stack 30 to utilize to satisfy the applied load. Such a generated hydrogen gas flow rate may be referred to herein as a threshold minimum generated hydrogen gas flow rate. Stated another way, startup of the fuel processor 50 may be complete when fuel processor 50 reaches the hydrogen-producing state. When fuel processor 50 includes purification assembly 72, the generated hydrogen gas flow rate and/or the generated hydrogen gas supply pressure may be that of purified hydrogen stream 73.

As shown in FIG. 1, fuel processor 50 may include a buffer tank 78 that is configured to receive generated hydrogen gas 52 and/or purified hydrogen stream 73 and to store a volume of generated hydrogen gas and/or purified hydrogen stream 73, such as prior to supply of generated hydrogen gas 52 and/or purified hydrogen stream 73 to fuel cell stack 30. Buffer tank 78 may increase a stability of the generated hydrogen gas supply pressure that is provided to fuel cell stack 30 and/or may decrease a potential for pressure variation in the pressure of the generated hydrogen gas 52 that is supplied to fuel cell stack 30, such as to prevent damage thereof.

During startup, fuel processor 50 may deliver generated hydrogen gas 52 to buffer tank 78 and pressurize buffer tank 78 with generated hydrogen gas 52. In some such examples, fuel processor 50 reaches the hydrogen producing state when the pressure of generated hydrogen gas contained in buffer tank 78 is or exceeds the threshold minimum generated hydrogen gas supply pressure. Stated in slightly different terms, the generated hydrogen gas supply pressure may be or include the pressure of stored hydrogen gas in buffer tank 78. Additionally or alternatively, when fuel processor 50 includes purification assembly 72, the generated hydrogen gas supply pressure may be or include the pressure of purified hydrogen stream 73. The pressure of generated hydrogen gas in buffer tank 78 may be referred to as a buffer pressure.

In view of the above, a threshold startup time may be needed for HPFCS 10 to produce subsequent electrical output 46 from generated hydrogen gas 52. The threshold startup time may include at least the duration of time between initiation of fuel processor 50 and completion of the startup of fuel processor 50. The startup of the fuel processor may be completed when fuel processor 50 reaches the hydrogen-producing state, or when HPFCS 10 produces the subsequent electrical output.

As mentioned, HPFCS 10 may be configured to supply stored hydrogen gas 24 to fuel cell stack 30 to at least partially satisfy the applied load with initial electrical output 42 during the startup of fuel processor 50. In particular, HPFCS 10 may include a stored hydrogen gas flow control valve 28 that is configured to permit or restrict flow of stored hydrogen gas 24 to fuel cell stack 30 from hydrogen storage device 20. Responsive to the primary power source lapse detection, HPFCS 10 may be configured to open stored hydrogen gas flow control valve 28 to permit flow of stored hydrogen gas 24 to fuel cell stack 30 to produce initial electrical output 42.

In view of the above, hydrogen storage device 20 may be configured to supply stored hydrogen gas 24 to fuel cell stack 30 during the threshold startup time. Hydrogen storage device 20 may be configured to store a volume 22 of stored hydrogen gas 24 that is at least sufficient to satisfy the applied load during the threshold startup time. Stated differently, hydrogen storage device 20 may be configured to supply stored hydrogen gas 24 to fuel cell stack 30 with a pressure and/or flow rate that is sufficient to at least partially satisfy the applied load during the threshold startup time.

Thus, and as used herein, references to hydrogen gas satisfying the applied load refer to the hydrogen gas (volume, pressure, flowrate, etc.) being sufficient, when delivered to fuel cell stack 30, to enable the fuel cell stack to generate an electrical output to satisfy the applied load. As discussed, stored hydrogen gas 24 being sufficient to at least partially satisfy the applied load during the threshold startup time may include stored hydrogen gas 24 being sufficient to satisfy, or completely satisfy, the applied load during the threshold startup time. Alternatively, stored hydrogen gas 24 being sufficient to at least partially satisfy the applied load during the threshold startup time may include stored hydrogen gas 24 being sufficient to satisfy a portion of the applied load during the threshold startup time, with stored electrical current 88 optionally being utilized to satisfy the remaining portion of the applied load.

HPFCS 10 may be configured to supply stored hydrogen gas 24 to fuel cell stack 30 at a stored hydrogen gas supply pressure that is sufficient to at least partially satisfy the applied load. The volume 22 of stored hydrogen gas 24 may be contained in hydrogen storage device 20 at a pressure that is greater than the stored hydrogen gas supply pressure. As shown in FIG. 1, HPFCS 10 may include at least one stored hydrogen gas pressure regulator 26 configured to reduce and/or otherwise regulate the pressure of stored hydrogen gas 24 that is delivered to fuel cell stack 30. Stored hydrogen gas pressure regulator 24 may be located in any suitable position between hydrogen storage device 20 and fuel cell stack 30. Stored hydrogen gas pressure regulator 26 may be configured to maintain a pressure differential between volume 22 of stored hydrogen gas 24 and the stored hydrogen gas 24 that is provided to fuel cell stack 30 such that the pressure of stored hydrogen gas 24 contained in hydrogen storage device 20 is greater than the stored hydrogen gas supply pressure. In other words, the stored hydrogen supply pressure may be the pressure of stored hydrogen gas 24 downstream of the stored hydrogen gas pressure regulator 26.

The volume 22 of stored hydrogen gas 24 contained in hydrogen storage device 20 may be sufficient to at least partially satisfy the applied load. To at least partially satisfy the applied load with the initial electrical output, stored hydrogen gas 24 may be supplied to fuel cell stack 30 with at least a threshold minimum stored hydrogen gas flow rate, such as at the stored hydrogen gas supply pressure. With this in mind, the volume 22 of stored hydrogen gas 24 in hydrogen storage device 20 that is sufficient to at least partially satisfy the applied load during the threshold startup time may be greater than a volume of stored hydrogen gas that is consumed by fuel cell stack 30 during the threshold startup time. In this way, stored hydrogen gas 24 may be supplied to fuel cell stack 30 from hydrogen storage device 20 with at least the threshold minimum stored hydrogen gas flow rate at the stored hydrogen gas supply pressure for the entirety of the threshold startup time.

As shown in FIG. 1, HPFCS 10 further may include a stored hydrogen gas pressure detector 121 that may be associated with and/or in communication with hydrogen storage device 20 and configured to detect the pressure of hydrogen gas contained in hydrogen storage device 20. Based on the pressure of stored hydrogen gas 24 within hydrogen storage device 20 detected by stored hydrogen gas pressure detector 121, HPFCS 10 may be configured to determine whether the pressure and/or volume 22 of stored hydrogen gas 24 contained within hydrogen storage device 20 is sufficient to at least partially satisfy the applied load during the threshold startup time.

As discussed in more detail herein, to avoid damage to fuel cell stack 30, HPFCS 10 may be configured to only permit flow of stored hydrogen gas 24 to fuel cell stack 30 to produce the initial electrical output 42 therefrom when the pressure and/or volume 22 of stored hydrogen gas 24 contained within hydrogen storage device 20 is sufficient to at least partially satisfy the applied load during the threshold startup time. With this in mind, responsive to the primary power source lapse detection, HPFCS 10 may be configured to utilize stored hydrogen gas pressure detector 121 to determine whether the pressure and/or volume 22 of stored hydrogen gas 24 in hydrogen storage device 20 is sufficient to satisfy the applied load during the threshold startup time. HPFCS 10 further may be configured to selectively actuate stored hydrogen gas flow control valve 28 to selectively permit or restrict flow of stored hydrogen gas 24 based on this determination.

HPFCS 10 may be configured to at least partially satisfy the applied load with initial electrical output 42 within a threshold initial supply time. The threshold initial supply time may be measured as the duration of time between the primary power source lapse detection and production of the initial electrical output 42. As discussed in more detail below, the threshold initial supply time may be on the order of seconds, while the threshold initial startup time may be on the order of minutes, or longer. As such, supply of stored hydrogen gas 24 to the fuel cell stack 30 may permit and/or facilitate improved and/or faster startup of HPFCS 10 and/or may permit the HPFCS 10 to more quickly, efficiently, and/or effectively provide backup power to energy-consuming device 120 as compared to a conventional HPFCS that does not include hydrogen storage device 20. Stated another way, HPFCS 10, may more quickly be able to satisfy the applied load due to the presence of the hydrogen storage device 20 as compared to a conventional HPFCS that does not include hydrogen storage device 20.

As shown in FIG. 1, HPFCS 10 may include a generated hydrogen gas flow control valve 54 that is configured to regulate the flow of generated hydrogen gas 52 from fuel processor 50 to fuel cell stack 30. HPFCS 10 may be configured to open generated hydrogen gas flow control valve 54 to permit flow of generated hydrogen gas 52 to fuel cell stack 30 when fuel processor 50 reaches the hydrogen-producing state. HPFCS 10 also may be configured to maintain generated hydrogen gas flow control valve 54 closed to prevent supply of generated hydrogen gas 52 to fuel cell stack 30 before fuel processor 50 reaches the hydrogen-producing state and/or while fuel processor 50 is being started up.

As mentioned, HPFCS 10 may be configured to initiate supply of generated hydrogen gas 52 to fuel cell stack 30 when fuel processor 50 produces generated hydrogen gas 52 with a generated hydrogen gas flow rate that is sufficient to satisfy the applied load. In some such examples, HPFCS 10 includes a generated hydrogen gas flow detector 176 that is configured to detect the generated hydrogen gas flow rate of generated hydrogen gas 52 and/or purified hydrogen stream 73, and HPFCS 10 may be configured to open generated hydrogen gas flow control valve 54 responsive to generated hydrogen gas flow detector 176 detecting that the generated hydrogen gas flow rate meets or exceeds the threshold minimum generated hydrogen gas flow rate.

As another example, HPFCS 10 may include a generated hydrogen gas pressure detector 178 that is configured to detect the generated hydrogen gas supply pressure. HPFCS 10 may be configured to open generated hydrogen gas flow control valve 54 to initiate supply of generated hydrogen gas 52 to fuel cell stack 30 when the generated hydrogen gas supply pressure meets or exceeds the threshold minimum generated hydrogen gas supply pressure. As a more specific example, HPFCS 10 may be configured to initiate supply of generated hydrogen gas 52 from fuel processor 50 when the generated hydrogen gas supply pressure exceeds a stored hydrogen gas supply pressure at which stored hydrogen gas 24 is supplied to fuel cell stack 30 and/or when the generated hydrogen gas supply pressure is or exceeds a threshold pressure differential greater than the stored hydrogen gas supply pressure. By this it is meant that the hydrogen gas supply pressure is greater than the stored hydrogen gas supply pressure by at least the threshold pressure differential. More specific examples of the threshold pressure differential are disclosed herein with reference to FIG. 2 and methods 200.

As yet another example, HPFCS 10 may be configured to supply generated hydrogen gas 52 and stored hydrogen gas 24 to a common hydrogen gas supply conduit 174 that is configured to deliver hydrogen gas to fuel cell stack 30. In such an example, HPFCS 10 may include a generated hydrogen gas check valve 76 that is configured to permit supply of generated hydrogen gas 52 to fuel cell stack 30 when the generated hydrogen gas supply pressure exceeds the stored hydrogen gas supply pressure. As yet a more specific example, generated hydrogen gas check valve 76 may be configured with a crack pressure corresponding to the threshold pressure differential such that the generated hydrogen gas check valve only permits supply of generated hydrogen gas 52 to fuel cell stack 30 when the generated hydrogen gas supply pressure meets or exceeds the threshold pressure differential greater than the stored hydrogen gas supply pressure. In other words, during startup of fuel processor 50, the stored hydrogen gas supply pressure in common hydrogen gas supply conduit 174 may exceed the generated hydrogen gas supply pressure and/or the generated hydrogen gas supply pressure may be less than the threshold pressure differential or greater than the stored hydrogen gas supply pressure. This may maintain generated hydrogen gas check valve 76 in a closed state and prevent fluid communication between fuel processer 50 and common hydrogen gas supply conduit 174. With this in mind, generated hydrogen gas check valve 76 also may prevent (back)flow of stored hydrogen gas 24 to fuel processor 50, which may prevent damage to one or more components of fuel processor 50. The generated hydrogen gas check valve 76 may be automatically opened to permit flow of generated hydrogen gas to fuel cell stack 30 when the generated hydrogen gas supply pressure meets or exceeds the threshold pressure differential greater than the stored hydrogen gas supply pressure.

When fuel processor 50 includes buffer tank 78, generated hydrogen gas flow control valve 54 and/or generated hydrogen gas check valve 76 may be actuated responsive to the pressure of generated hydrogen gas 52 within buffer tank 78, such as in the manner discussed herein. Additionally or alternatively, when fuel processor 50 includes purification assembly 72, generated hydrogen gas flow control valve 54 and/or generated hydrogen gas check valve 76 may be actuated responsive to the pressure of purified hydrogen stream 73, such as in the manner discussed herein.

HPFCS 10 also may be configured to restrict and/or cease flow of stored hydrogen gas 24 to fuel cell stack 30 responsive to fuel processor 50 reaching the hydrogen-producing state. For example, HPFCS 10 may be configured to close stored hydrogen gas flow control valve 28 to cease flow of stored hydrogen gas 24 to fuel cell stack 30 responsive to fuel processor 50 reaching the hydrogen-producing state and/or responsive to supply of generated hydrogen gas 52 to fuel cell stack 30. As a more specific example, HPFCS 10 may be configured to close stored hydrogen gas flow control valve 28 responsive to a detection from generated hydrogen gas flow detector 176 that the generated hydrogen gas flow rate meets or exceeds the threshold minimum generated hydrogen gas flow rate. As another more specific example, HPFCS 10 may be configured to close stored hydrogen gas flow control valve 28 responsive to a detection from generated hydrogen gas pressure detector 178 that the generated hydrogen gas supply pressure meets or exceeds the threshold minimum generated hydrogen gas supply pressure.

For examples in which HPFCS 10 is configured to supply stored hydrogen gas 24 and generated hydrogen gas 52 to fuel cell stack 30 via common hydrogen gas supply conduit 174, HPFCS 10 may include a stored hydrogen gas check valve 77 configured to cease flow of stored hydrogen gas to common hydrogen gas supply conduit 174. Stored hydrogen gas check valve 77 may be configured to cease flow of stored hydrogen gas to common hydrogen gas supply conduit 174 responsive to the generated hydrogen gas supply pressure meeting or exceeding the stored hydrogen gas supply pressure and/or responsive to the generated hydrogen gas supply pressure meeting or exceeding the threshold pressure differential greater than the stored hydrogen gas supply pressure, such as in the manner discussed herein. Additionally or alternatively, generated hydrogen gas check valve 76 may include a three-way check valve that is configured to simultaneously cease flow of stored hydrogen gas 24 and permit flow of generated hydrogen gas to common hydrogen gas supply conduit 174 responsive to the generated hydrogen gas supply pressure exceeding the stored hydrogen gas supply pressure and/or responsive to the generated hydrogen gas supply pressure meeting or exceeding the threshold pressure differential greater than the stored hydrogen gas supply pressure.

HPFCS 10 may be configured to utilize a portion of initial electrical output 42 to power one or more components of HPFCS 10 during the startup of fuel processor 50 and/or during the threshold startup time. In particular, HPFCS 10 may be configured to facilitate startup of fuel processor 50 utilizing initial electrical output 42. As a more specific example, HPFCS 10 may be configured to power feed stream pumps 161 with at least some of the portion of initial electrical output 42 to deliver feed stream(s) 61 to reforming region 60. As another example, HPFCS 10 may be configured to actuate stored hydrogen gas flow control valve 28 and/or generated hydrogen gas flow control valve 54 utilizing initial electrical output 42, such as in a manner discussed herein.

As shown in FIG. 1, HPFCS 10 also may include and/or otherwise may be associated with an electrical energy storage device 86. HPFCS 10 may direct electrical energy storage device 86 to provide, or to selectively provide, a stored electrical current 88 to at least partially satisfy the applied load. For convenience, the present disclosure will refer to HPFCS 10 as including and/or as being associated with an electrical energy storage device 86. However, it is within the scope of the present disclosure that electrical energy storage devices 86 may include any suitable number of electrical energy storage devices, such as at least one electrical energy storage device and/or a plurality of electrical energy storage devices. It also is within the scope of the present disclosure that electrical energy storage device 86 may be distinct from and/or external to the HPFCS 10, as illustrated in dotted lines in FIG. 1. More specific examples of energy storage devices that may be, or may be included in, suitable electrical energy storage device 86 are disclosed herein.

As discussed in more detail herein with reference to methods 200 of FIG. 2, electrical energy storage device 86 may be configured to satisfy the applied load when both primary power source 100 and fuel cell stack 30 are unable to satisfy the applied load. As a more specific example, HPFCS 10 may be configured to direct electrical energy storage device 86 to provide stored electrical current 88 to satisfy the applied load during the threshold initial supply time. In other words, HPFCS 10 may be configured to direct electrical energy storage device 86 to provide stored electrical current 88 to satisfy the applied load responsive to the primary power lapse detection and before HPFCS 10 produces initial electrical output 42 from stored hydrogen gas 24. Thus, in some examples, HPFCS 10 is configured to cease supply of stored electrical current 88 from electrical energy storage device 86 to the applied load responsive to the production of initial electrical output 42. Alternatively, HPFCS 10 may be configured to cease supply of stored electrical current 88 from electrical energy storage device 86 to the applied load responsive to the production of subsequent electrical output 46. In such an example, during startup of fuel processor 50, HPFCS 10 may be configured to completely satisfy the applied load with a combination of initial electrical output 42 and stored electrical current 88.

Inclusion of hydrogen storage device 20 decreases the time required for HPFCS 10 to satisfy the applied load, or at least partially satisfy the applied load, utilizing electrical output from fuel cell stack 30. As such, a size and/or overall energy storage capacity of electrical energy storage device 86 may be decreased due to inclusion of the hydrogen storage device 20 within the HPFCS 10. Stated another way, HPFCS 10 may include and/or be associated with an electrical energy storage device 86 having a smaller overall energy storage capacity as compared to a conventional HPFCS due to the inclusion and/or utilization of hydrogen storage device 20 in HPFCS 10 to provide initial electrical output 42. Stated yet another way, the overall energy storage capacity of electrical energy storage device 86 may be sufficient to satisfy the applied load during the threshold initial supply time. However, the overall energy storage capacity of electrical energy storage device 86 may be less than that which is sufficient to satisfy the applied load for durations greater than the initial supply time. As a more specific example, the overall energy storage capacity of electrical energy storage device 86 may be less than that which is sufficient to satisfy the applied load for the threshold startup time.

FIG. 2 is a flowchart depicting examples of methods 200 of operating a hydrogen-producing fuel cell system, such as HPFCS 10, according to the present disclosure. In FIG. 2, some steps are illustrated in dashed boxes, indicating that such steps may be optional or may correspond to an optional version of methods 200. That said, not all methods 200 are required to include the steps illustrated in solid boxes. The methods and steps of FIG. 2 are not limiting, and other methods and steps are within the scope of the present disclosure, including methods having greater than or fewer than the number of steps illustrated, as understood from the discussion herein. Each step or portion of methods 200 may be performed utilizing the HPFCS 10 of FIG. 1 and/or portions thereof that are illustrated and discussed herein with reference to FIG. 1. Likewise, any of the features, functions, structures, configurations, characteristics, properties, variants, options, etc. of hydrogen-producing fuel processing systems that are discussed herein with reference to FIG. 2 and methods 200 may be included in or utilized with HPFCS 10 according to FIG. 1.

Methods 200 include detecting an inability to satisfy an applied load at 205 and may include initiating supply of a stored electrical current at 210 and/or determining that a hydrogen storage device includes sufficient hydrogen gas at 215. Methods 200 also include initiating startup of a fuel processor at 220 and initiating supply of stored hydrogen gas at 225, and methods 200 may include regulating supply of stored hydrogen gas at 230. Methods 200 further include consuming stored hydrogen gas at 240, and methods 200 may include selectively permitting a fuel cell stack to produce an initial electrical output at 245. Methods 200 also include satisfying an applied load with the initial electrical output at 250. Methods 200 may include purifying generated hydrogen gas at 260. Methods 200 further include initiating supply of generated hydrogen gas at 265 and may include regulating a generated hydrogen gas supply pressure at 270 and/or restricting flow of stored hydrogen gas at 275. Methods 200 also include consuming generated hydrogen gas at 280 and satisfying the applied load with a subsequent electrical output at 285.

In the flowchart of FIG. 2, a first prong is utilized to indicate at least some of the steps that are performed with, or in association with, stored hydrogen gas, with these steps being illustrated in sequence with one another. A second prong is utilized to indicate some of the steps of methods 200 that are performed with, in association with, and/or to produce generated hydrogen gas, and these steps are illustrated in sequence with one another. The steps of methods 200 of the first prong are illustrated in parallel to the steps shown in the second prong. As discussed in more detail herein, in some examples of methods 200, one or more steps illustrated in the second prong of FIG. 2 may be performed independently of and/or with any suitable sequence or timing relative to one or more steps illustrated in the first prong of FIG. 2. In some other examples of methods 200, one or more steps illustrated in the second prong of FIG. 2 may be performed in sequence with, responsive to, prior to, and/or with one or more steps of the first prong of FIG. 2.

The detecting the inability of the primary power source to satisfy the applied load at 205 may be performed in any suitable manner and/or utilizing any suitable structure that may be adapted, configured, designed, and/or constructed to detect the inability of the primary power source to satisfy the applied load. As an example, the detecting at 205 may include detecting with, via, and/or utilizing primary power detector 80 of FIG. 1, examples of which are disclosed herein. As mentioned, the applied load may be from an energy-consuming device and/or from one or more components of the HPFCS. Examples of the primary power source, of the energy-consuming device, and of components of HPFCS 10 that may be included in the applied load also are disclosed herein. Examples of components of the HPFCS that may define portions of the applied load prior to the detecting at 205 include an electrical heating assembly of or associated with the HPFCS, such as electrical heating assembly 172 of FIG. 1, and/or a controller of the HPFCS, such as controller 90 of FIG. 1.

The detecting at 205 may include detecting an absence of a primary electrical output to the energy-consuming device from the primary power source. As another example, the detecting at 205 may include detecting a decrease in a monitored voltage. Examples of the monitored voltage include a primary voltage of the primary power source, such as primary power source 100 of FIG. 1, a grid voltage of an electrical grid configured to provide a grid electric current to the energy-consuming device, and/or an energy storage device voltage of an electrical energy storage device, such as electrical energy storage device 86 of FIG. 1, which is configured to provide a stored electrical current to the energy-consuming device. Additional examples of the monitored voltage include a voltage supplied to the HPFCS, a voltage provided to an electrical heating assembly of the HPFCS, such as electrical heating assembly 172 of FIG. 1, utilized to maintain the HPFCS in a standby and/or a thermally primed state, and/or any other suitable voltage provided to the energy-consuming device.

The decrease in the monitored voltage may have any suitable magnitude. As examples, the decrease in the monitored voltage may be at least 5%, at least 10%, at least 15%, at least 20%, at least 25%, at least 30%, at least 40%, and/or at least 50% of a nominal voltage value. As additional examples, the decrease in the monitored voltage may be at least 0.5 volts, at least 1 volt, at least 1.5 volts, at least 2 volts, at least 2.5 volts, at least 3 volts, at least 4 volts, at least 5 volts, at most 10 volts, at most 9 volts, at most 8 volts, at most 7 volts, at most 6 volts, at most 5 volts, at most 4 volts, and/or at most 3 volts.

In some examples, and subsequent to the detecting at 205, methods 200 may include maintaining the energy-consuming device in an unpowered state prior to satisfying at 250 and/or prior to supply of the initial electrical output to the energy-consuming device. In some such examples, methods 200 further may include starting up the energy-consuming device, bringing the energy-consuming device online, and/or powering up the energy-consuming device responsive to receipt of the initial electrical output from the fuel cell stack. Such a configuration, which may be referred to herein as a "black start," may decrease an overall energy consumption by the HPFCS and/or by the energy-consuming device prior to generation of the initial electrical output by the fuel cell stack. This may decrease a need for, and/or decrease a needed storage capacity of, the electrical energy storage device of the HPFCS, when present.

In some examples, the HPFCS may include and/or be associated with the electrical energy storage device, which may be configured to selectively provide a stored electrical current to the applied load, such as to satisfy the applied load during the time period between when the primary power source initially cannot do so and when HPFCS 10 begins to generate sufficient electrical output to do so. Examples of the electrical energy storage device are disclosed herein.

In some such examples, methods 200 may include initiating supply of the stored electrical current at 210. The initiating at 210 may include initiating supply of the stored electrical current to the applied load, which may be from one or more components of the HPFCS and/or the energy-consuming device. The initiating at 210 and/or the supply of stored electrical current to the applied load may be performed responsive to the detecting at 205 and/or may be performed at least partially concurrently with initiating at 225 and/or with the supply of stored hydrogen gas from the hydrogen storage device to the fuel cell stack.

Determining that the hydrogen storage device includes sufficient hydrogen gas at 215 may include determining that a hydrogen storage device of the HPFCS, which is configured to provide the stored hydrogen gas to the fuel cell stack responsive to and/or subsequent to the initiating at 225, includes hydrogen gas and/or contains hydrogen gas. Additionally or alternatively, the determining at 215 may include determining that the hydrogen storage device includes hydrogen gas sufficient to provide the stored hydrogen gas to the fuel cell stack for at least a threshold startup time of the fuel processor.

In particular, the determining at 215 may include determining that the volume of stored hydrogen gas in the hydrogen storage device is sufficient for the hydrogen storage device to supply the stored hydrogen gas to the fuel cell stack at a stored hydrogen gas flow rate that is sufficient to at least partially satisfy the applied load for at least a threshold startup. The determining at 215 also may include determining that the volume of stored hydrogen gas in the hydrogen storage device is sufficient for the hydrogen storage device to supply the stored hydrogen gas to the fuel cell stack at a stored hydrogen gas supply pressure that is sufficient to at least partially satisfy the applied load for at least the threshold startup time. Examples of the hydrogen storage device are disclosed herein. Examples of the HPFCS and of the fuel cell stack also are disclosed herein.

The determining at 215 may include detecting a pressure of the stored hydrogen gas within the hydrogen storage device, such as by utilizing the stored hydrogen gas pressure detector 121 of FIG. 1, and determining that the pressure and/or volume of stored hydrogen gas contained in the hydrogen storage device is sufficient to satisfy the applied load for at least the threshold startup time based upon the pressure of the stored hydrogen gas in the hydrogen storage device.

The determining at 215 may be performed prior to the initiating at 225, such as to decrease a potential for damage to the fuel cell stack. As an example, fuel cell stacks often are configured such that, if a supply of fuel (e.g., hydrogen gas) to the fuel cell stack is insufficient to satisfy an applied load, the fuel cell stack will operate in an inefficient operational regime that will cause generation of excessive heat. This excessive heat may be detrimental to operation of the fuel cell stack and/or may cause damage to the fuel cell stack. As such, the determining at 215 may be utilized to ensure that the fuel cell stack is not damaged during the initiating at 225, while the hydrogen storage device provides stored hydrogen gas to the fuel cell stack, and/or while the fuel cell stack supplies the initial electrical output to the energy-consuming device.

Initiating supply of the stored hydrogen gas at 225 may include initiating supply of the stored hydrogen gas from the hydrogen storage device of the HPFCS, such as hydrogen storage device 20 of FIG. 1, to the anode, or anode region, of the fuel cell stack. The initiating at 225 may be performed with any suitable sequence or timing within methods 200. As an example, the initiating at 225 may be at least partially responsive to and/or a result of the detecting at 205. The initiating at 225 also may be performed prior to and/or at least substantially simultaneously with initiating startup of the fuel processor at 220, prior to initiating supply of generated hydrogen gas at 265, prior to regulating supply of stored hydrogen gas at 230, and/or prior to consuming the stored hydrogen gas at 240.

The initiating at 225 may be performed in any suitable manner. As an example, the hydrogen storage device may include, may house, and/or may contain a volume of stored hydrogen gas, and the initiating at 225 may include flowing at least a portion of the volume of stored hydrogen gas from the hydrogen storage device and/or to the fuel cell stack. It is within the scope of the present disclosure that the volume of stored hydrogen gas may be sufficient to operate the HPFCS and/or to satisfy the applied load for at least a threshold initial supply time, examples of which are disclosed herein with reference to the satisfying at 250. The initiating at 225 also may include supplying the stored hydrogen gas to the fuel cell stack at a stored hydrogen gas flow rate and/or at a stored hydrogen gas supply pressure. The stored hydrogen gas flow rate may be at least a threshold minimum flow rate of hydrogen gas that is sufficient for the fuel cell stack to produce the initial electrical output and at least partially satisfy the applied load therewith. Similarly, the stored hydrogen gas supply pressure may be at least a threshold minimum pressure of hydrogen gas that is sufficient for the fuel cell stack to produce the initial electrical output and at least partially satisfy the applied load therewith.

Flow of the stored hydrogen gas to the fuel cell stack may be controlled and/or regulated in any suitable manner. As an example, a flow control valve, such as stored hydrogen gas flow control valve 28 of FIG. 1, may be utilized to selectively permit and/or block flow of the stored hydrogen gas to the fuel cell stack. In such an example, the initiating at 225 may include selectively opening stored hydrogen gas flow control valve 28 to permit flow of stored hydrogen gas to the fuel cell stack. In some examples, methods 200 include opening the stored hydrogen control valve to initiate supply of the stored hydrogen gas to the fuel cell stack utilizing a portion of the stored electrical current.

As shown in FIG. 2, methods 200 may include regulating supply of the stored hydrogen gas at 230, and this regulating may include selectively delivering the stored hydrogen gas to the fuel cell stack and/or regulating a stored hydrogen gas supply pressure at which the stored hydrogen gas is supplied to the fuel cell stack. More specifically, the stored hydrogen gas may be contained in the hydrogen storage device at a storage pressure, and methods 200 may include providing the stored hydrogen gas to the fuel cell stack at a pressure that is different from, such as less than, the storage pressure. In such examples, the regulating at 230 includes regulating the stored hydrogen gas supply pressure, which may include utilizing a stored hydrogen gas pressure regulator of the HPFCS. An example of stored hydrogen gas pressure regulator 26 is illustrated in FIG. 1 at 26.

Examples of the stored hydrogen gas supply pressure include pressures of at least 50 kilopascals (kPa), at least 60 kPa, at least 70 kPa, at least 80 kPa, at least 90 kPa, at least 100 kPa; at most 150 kPa, at most 140 kPa, at most 130 kPa, at most 120 kPa, at most 110 kPa, at most 100 kPa, at most 90 kPa, at most 80 kPa, at most 70 kPa, at most 60 kPa, and/or at most 50 kPa. As discussed in more detail herein with reference to restricting at 275, the stored hydrogen gas supply pressure may be less than a generated hydrogen gas supply pressure of the generated hydrogen gas when the fuel processor is in a hydrogen-producing state, which may permit and/or facilitate an effective, efficient, and/or automatic transition from operation of the fuel cell stack utilizing stored hydrogen gas from the hydrogen storage device to operation of the fuel cell stack utilizing generated hydrogen gas from the fuel processor.

Additionally or alternatively, the regulating at 230 may include selectively delivering the stored hydrogen gas to the fuel cell stack, such as an anode thereof, and preventing flow of the stored hydrogen gas to other portions of the HPFCS. As a more specific example, the regulating at 230 may include restricting flow of stored hydrogen gas to the fuel processor, which may include blocking, occluding, and/or stopping flow of stored hydrogen gas to the fuel processor, and such restricting may be performed with any suitable timing, in any suitable manner, and/or utilizing any suitable structure. As a more specific example, the restricting flow of stored hydrogen gas to the fuel processor may include restricting with, via, and/or utilizing a check valve, such as generated hydrogen gas check valve 76 of FIG. 1. In this example, generated hydrogen gas check valve 76 may be configured to permit fluid flow from reforming region 60 and/or a purification assembly 72 toward fuel cell stack 30, such as when the generated hydrogen gas supply pressure is at least the threshold minimum generated hydrogen gas supply pressure, and to restrict fluid flow from fuel cell stack 30 and/or hydrogen storage device 20 toward and/or to fuel processor 50, and/or the components thereof, such as purification assembly 72. Such a configuration may decrease a potential for back pressure on one or more components of the fuel processor.

When included in methods 200, the regulating at 230 may be performed with any suitable sequence or timing within methods 200, such as at least subsequent to the initiating at 225 and/or during flow of stored hydrogen gas to the fuel cell stack.

With continued reference to FIG. 2, methods 200 include consuming stored hydrogen gas at 240. The consuming at 240 may include consuming the stored hydrogen gas with and/or within the fuel cell stack to produce and/or generate the initial electrical output from the fuel cell stack. The consuming at 240 may be responsive to and/or a result of the detecting at 205 and/or the initiating at 225. Additionally or alternatively, the consuming at 240 may be responsive to and/or a result of receipt of the stored hydrogen gas and/or the oxidant by the fuel cell stack.

As discussed in more detail herein, fuel cell stacks may consume both a fuel, such as hydrogen gas, the stored hydrogen gas, and/or the generated hydrogen gas, and an oxidant, such as oxygen and/or air that includes oxygen, to produce and/or generate an electrical output, such as the initial electrical output and/or the subsequent electrical output. With this in mind, the consuming at 240 may include providing the oxidant to the fuel cell stack. More specifically, the consuming at 240 may include providing the oxidant to a cathode of the fuel cell stack.

The consuming at 240 may include actively providing the oxidant to the fuel cell stack. As an example, a fan, compressor, and/or other oxidant conveyance structure may be utilized to actively provide the oxidant to the fuel cell stack. As another example, the oxidant may be provided from a pressurized oxidant source, with flow of oxidant to the fuel cell stack being controlled and/or regulated by an oxidant supply valve. Examples of fuel cell stacks where the oxidant may be actively provided include a closed cathode fuel cell stack and/or an open cathode fuel cell stack.

Alternatively, the consuming at 240 may include passively providing the oxidant to the fuel cell stack. As an example, the cathode of the open cathode fuel cell stack may be exposed to air, and natural convection and/or naturally occurring oxidant concentration gradients within the air may produce and/or generate sufficient flow of the oxidant to the fuel cell stack to accommodate the flow of stored hydrogen gas to the fuel cell stack. In such examples, the providing the oxidant to the fuel cell stack additionally or alternatively may be referred to herein as permitting ambient air to contact and/or flow through the open cathode.

With continued reference to FIG. 2, methods 200 may include selectively permitting the fuel cell stack to produce the initial electrical output at 245, which may include selectively permitting the fuel cell stack to produce the initial electrical output based upon any suitable criteria. As an example, the selectively permitting at 245 may be based upon and/or responsive to the determining at 215. Stated another way, the determining at 215 may include determining that the hydrogen storage device includes stored hydrogen gas sufficient to permit operation of the fuel cell stack and/or generation of the initial electrical output without damage to the fuel cell stack. Under these conditions, the selectively permitting at 245 may permit the initial electrical output from the fuel cell stack. In contrast, in conditions in which the determining at 215 includes the hydrogen storage device not having sufficient stored hydrogen gas to permit operation of the fuel cell stack without damage to the fuel cell stack, the selectively permitting at 245 may not be performed and/or the fuel cell stack may not be permitted to provide the initial electrical output to the energy-consuming device.

As another example, the HPFCS generally may be configured only to permit the subsequent electrical output from the fuel cell stack when the fuel processor is generating the generated hydrogen gas and/or subsequent to the threshold startup time for the fuel processor. In such a configuration, the selectively permitting at 245 may include selectively permitting the initial electrical output from the fuel cell stack prior to expiration of the threshold startup time for the fuel processor, before the fuel processor is generating the generated hydrogen gas, and/or before the fuel processor reaches the hydrogen producing state.

The selectively permitting at 245 may be performed in any suitable manner. As an example, the selectively permitting at 245 may include permitting flow of the stored hydrogen gas to the fuel cell stack when the determining at 215 includes determining that the hydrogen storage device includes sufficient hydrogen gas. Conversely, the selectively permitting at 245 may include restricting flow of the stored hydrogen gas to the fuel cell stack when the determining at 215 includes determining that the hydrogen storage device does not include sufficient hydrogen gas.

Methods 200 further include satisfying the applied load with the initial electrical output at 250, which may include at least partially, or even completely, satisfying the applied load with the initial electrical output from the fuel cell stack. More specifically, the satisfying at 250 may include satisfying the portion of the applied load from the energy-consuming device, which is illustrated in FIG. 1, with initial electrical output 42 being provided to energy-consuming device 120 from fuel cell stack 30. As discussed herein with reference to the initiating at 220, the satisfying at 250 also may include satisfying the portion of the applied load from one or more components of the HPFCS, such as the one or more feed stream pumps. As more examples, the satisfying at 250 may include utilizing the applied load to actuate one or more flow control valves, and/or one or more pressure regulators of the HPFCS. As more specific examples, the satisfying at 250 may include utilizing the initial electrical output to selectively open the generated hydrogen gas flow control valve.

In some examples, the satisfying at 250 may include completely satisfying the applied load with the initial electrical output and/or satisfying the applied load solely with the initial electrical output. Thus, for examples in which methods 200 include the initiating at 210, the satisfying at 250 may include ceasing supply of the stored electrical current to the applied load when the satisfying at 250 includes completely satisfying the applied load with the initial electrical output. In other examples, such as when methods 200 include the initiating at 210, the satisfying at 250 may include partially satisfying the applied load with the initial electrical output, partially satisfying the applied load with the stored electrical current, and completely satisfying the applied load with a combination of the initial electrical output and the stored electrical current.

The satisfying at 250 may include at least partially satisfying the applied load with the initial electrical output during a startup timeframe in which stored hydrogen gas is the only hydrogen gas that is provided to the fuel cell stack. Examples of the startup timeframe are disclosed herein with reference to the threshold startup time for the fuel processor.

The satisfying at 250 additionally or alternatively may include at least partially satisfying the applied load with the initial electrical output within a threshold initial supply time. Examples of the threshold initial supply time include at least 1 second (s), at least 5 s, at least 10 s, at least 15 s, at least 20 s, at least 25 s, at least 30 s, at least 35 s, at least 40 s, at least 45 s, at most 120 s, at most 110 s, at most 100 s, at most 90 s, at most 80 s, at most 70 s, at most 60 s, at most 50 s, at most 40 s, at most 30 s, at most 20 s, at most 10 s, and/or at most 5 s.

It is within the scope of the present disclosure that the threshold initial supply time may be less than a threshold fraction of the threshold startup time for the fuel processor. Examples of the threshold fraction include less than 80%, less than 70%, less than 60%, less than 50%, less than 40%, less than 30%, less than 25%, less than 20%, less than 15%, less than 10%, or less than 5% of the threshold startup time for the fuel processor.

The applied load during the satisfying at 250 may be from the same or different components as the applied load prior to the detecting at 205, or the applied load satisfied by the primary electrical output. For example, when the applied load is at least partially satisfied with the initial electrical output, the satisfying at 250 may not include utilizing a portion of the initial electrical output to power the electrical heating assembly. As another example, the applied load being at least partially satisfied during the satisfying at 250 may be at least in part from one or more components of the HPFCS, such as one or more feed stream pumps of a feedstock delivery system of the HPFCS, such as feed stream pumps 161 of FIG. 1, one or more components of the fuel processor and/or one or more valves of the HPFCS, while the applied load prior to the detecting at 205 may not be from the one or more feed stream pumps.

Initiating startup of the fuel processor at 220 may include initiating startup of the fuel processor 50 of the HPFCS 10 of FIG. 1. The initiating at 220 may be at least partially responsive to the detecting at 205, may be performed at least partially concurrently with the initiating at 225, may be performed subsequent to the initiating at 225, and may be performed during supply of stored hydrogen gas to the fuel cell stack, at least partially concurrently with the satisfying at 250. Examples of suitable fuel processors are disclosed herein.

The initiating at 220 may include initiating supply of one or more feed streams to a reforming, or hydrogen-producing, region of the fuel processor. Examples of the one or more feed streams include a carbon-containing feedstock and water and are discussed in more detail herein. In a specific example, such as when the reforming region is a steam reforming region, the one or more feed streams may include an alcohol, such as methanol, and water. The initiating at 220 additionally or alternatively may include heating the reforming region of the fuel processor, and/or a purification assembly of the fuel processor, to a hydrogen-producing temperature range, examples of which are disclosed herein. The heating may include heating with, via, and/or utilizing a heating assembly, such as heating assembly 70 of FIG. 1. Examples of the heating assembly are disclosed herein.

In some examples, the fuel processor may include and/or be a thermally primed fuel processor that maintains reforming region 60 and/or purification assembly 72 near and/or within the hydrogen-producing temperature range. Examples of the thermally primed temperature include temperatures of at least 50%, at least 55%, at least 60%, at least 65%, at least 70%, at least 75%, at least 80%, at least 85%, at least 90%, or at least 95% of a lower threshold of the hydrogen-producing temperature range, as measured in degrees Celsius. Additional examples of the thermally primed temperature include temperatures of at most 100%, at most 95%, at most 90%, at most 85%, at most 80%, or at most 75% of an upper threshold of the hydrogen-producing temperature range, as measured in degrees Celsius. Another example of the thermally primed temperature includes temperatures that are within the hydrogen-producing temperature range.

Examples of the lower threshold of the hydrogen-producing temperature range include temperatures of at least 200 degrees Celsius (° C.), at least 225° C., at least 250° C., at least 275° C., at least 300° C., at least 325° C., at least 350° C., at least 375° C., at least 400° C., at least 425° C., at least 450° C., at least 475° C., at least 500° C., at least 525° C., at least 550° C., at least 575° C., at least 600° C., at least 625° C., at least 650° C., at least 675° C., at least 700° C., at least 725° C., or at least 750° C. Examples of the upper threshold of the hydrogen-producing temperature range include temperatures of at most 900° C., at most 875° C., at most 850° C., at most 825° C., at most 800° C., at most 775° C., at most 750° C., at most 725° C., at most 700° C., at most 675° C., at most 650° C., at most 625° C., at most 600° C., at most 575° C., at most 550° C., at most 525° C., at most 500° C., at most 475° C., at most 450° C., at most 425° C., or at most 400° C.

For some examples in which the fuel processor is a thermally primed fuel processor, the initiating at 220 may include increasing a temperature of the fuel processor and/or of the reforming region from the thermally primed temperature to the hydrogen-producing temperature range. For some examples in which the fuel processor is a thermally primed fuel processor, methods 200 may include maintaining the fuel processor in the thermally primed state prior to the detecting. In such examples, the maintaining the fuel processor in the thermally primed state includes heating the fuel processor to within the thermally primed temperature range utilizing an electrical heating assembly, such as electrical heating assembly 172 of FIG. 1. In some such examples, the maintaining the fuel processor in the thermally primed state includes utilizing the primary electrical output from the primary power source to heat the fuel processor with the electrical heating assembly.

The initiating at 220 may include utilizing a portion of the initial electrical output from the fuel cell stack to power and/or actuate one or more components of the HPFCS. As an example, the initiating at 220 may include utilizing at least some of the portion of the initial electrical output to power the one or more feed stream pumps, such as feed stream pump(s) 161 of FIG. 1, to selectively deliver the one or more feed streams to the fuel processor. Thus, in some examples, at least a portion of the initiating at 220 is performed with and/or subsequent to the satisfying at 250.

Methods 200 further may include purifying generated hydrogen gas at 260. The purifying at 260 may include removing one or more impurities from the hydrogen gas prior to supply of the hydrogen gas to the fuel cell stack. As an example, the fuel processor may include a purification assembly, such as purification assembly 72 of FIG. 1. In such an example, the reforming region may be configured to generate a mixed gas stream that includes hydrogen gas and other gasses, and the purification assembly may be configured to separate the mixed gas stream into a purified hydrogen gas stream and a byproduct stream. This is illustrated in FIG. 1, with purification assembly 72 receiving mixed gas stream 66 and separating the mixed gas stream into a purified hydrogen stream 73 and a byproduct stream 74 that includes other gasses 68. When methods 200 include the purifying at 260, the initiating at 265 may include initiating supply of the purified hydrogen gas to the fuel cell stack as the generated hydrogen gas.

In some examples of the HPFCS, and as indicated in FIG. 1 at 78, the fuel processor may include a buffer tank. In such examples, methods 200 further may include storing a volume of the generated hydrogen gas and/or of the purified hydrogen gas in the buffer tank prior to supply of the generated hydrogen gas to the fuel cell stack. In some such examples, methods 200 further may include pressurizing the buffer tank with the generated hydrogen gas and/or with the purified hydrogen gas. Such a configuration may increase a stability in a pressure of the generated hydrogen gas as it is provided to the fuel cell stack and/or may decrease a potential for pressure variation in the pressure of the generated hydrogen gas subsequent to the initiating at 265.

Methods 200 further include initiating supply of generated hydrogen gas at 265, which may include initiating supply of generated hydrogen gas from the fuel processor to the fuel cell stack. The initiating at 265 may be performed subsequent to at least the threshold startup time for the fuel processor and/or after the fuel processor has begun generating the generated hydrogen gas. Additionally or alternatively, and when the HPFCS includes the buffer tank, the initiating at 265 may be performed subsequent to pressurization of the buffer tank to at least a threshold buffer pressure with the generated hydrogen gas.

In some examples, the initiating at 265 additionally or alternatively may include initiating supply of the generated hydrogen gas to the fuel cell stack responsive to the fuel processor reaching the hydrogen-producing state. As discussed herein, the fuel processor reaching the hydrogen-producing state may include the fuel processor producing the generated hydrogen gas with a generated hydrogen gas flow rate that is sufficient to satisfy the applied load. Additionally or alternatively, the fuel processor reaching the hydrogen-producing state may include the fuel processor producing the generated hydrogen gas with a generated hydrogen gas supply pressure that exceeds the stored hydrogen gas supply pressure at which the stored hydrogen gas is provided to the fuel cell stack, and/or that is the threshold pressure differential greater than the stored hydrogen gas supply pressure.

The threshold startup time for the fuel processor generally will include the time needed for the fuel processor to reach the hydrogen-producing state and/or the time needed for the fuel processor to produce sufficient generated hydrogen gas to satisfy the applied load. Examples of the threshold startup time include times of at least 1 minute, at least 1.5 minutes, at least 2 minutes, at least 2.5 minutes, at least 3 minutes, at least 3.5 minutes, at least 4 minutes, at least 4.5 minutes, at least 5 minutes, at most 30 minutes, at most 25 minutes, at most 20 minutes, at most 15 minutes, at most 10 minutes, at most 9 minutes, at most 8 minutes, at most 7 minutes, at most 6 minutes, at most 5 minutes, and/or at most 4 minutes. In general, and as discussed, the threshold startup time for the fuel processor is greater than the threshold initial supply time for at least partially satisfying the applied load utilizing stored hydrogen gas.

The initiating at 265 may be controlled and/or regulated in any suitable manner. As an example, the initiating at 265 may be controlled by and/or a result of the regulating at 270. As another example, the initiating at 265 may include opening a generated hydrogen gas flow control valve, such as generated hydrogen gas flow control valve 54 of FIG. 1, to initiate supply of the generated hydrogen gas to the fuel cell stack. Additionally or alternatively, for examples in which the HPFCS includes generated hydrogen gas check valve 76 discussed herein with reference to FIG. 1, the initiating at 265 may be performed and/or occur automatically with the generated hydrogen gas supply pressure exceeding, or being at least the threshold pressure differential greater than, the stored hydrogen gas supply pressure.

Regulating the generated hydrogen gas supply pressure at 270 may include regulating the generated hydrogen gas supply pressure at which the generated hydrogen gas is supplied to the fuel cell stack and may be accomplished in any suitable manner. As an example, the HPFCS may include a generated hydrogen gas pressure regulator, such as generated hydrogen gas pressure regulator 56 of FIG. 1, which may be configured to regulate the generated hydrogen gas supply pressure.

The regulating at 270 may include ensuring that the generated hydrogen gas supply pressure is at least a threshold pressure differential greater than the stored hydrogen gas supply pressure. Such a configuration may cause the HPFCS to transition, or to automatically transition, from supply of the stored hydrogen gas to the fuel cell stack to supply of the generated hydrogen gas to the fuel cell stack responsive to initiation of the flow of the generated hydrogen gas to the fuel cell stack. Stated another way, upon supply of the generated hydrogen gas to the fuel cell stack at a threshold pressure differential greater than the stored hydrogen gas supply pressure, the stored hydrogen gas pressure regulator and/or the stored hydrogen gas check valve may cease flow of the stored hydrogen gas to the fuel cell stack.

The regulating at 270 additionally or alternatively may include utilizing the generated hydrogen gas check valve, such as generated hydrogen gas check valve 76 of FIG. 1, to regulate the generated hydrogen gas supply pressure. More specifically, the regulating at 270 may include restricting flow of the generated hydrogen gas to the fuel cell stack during the startup of the fuel processor and/or when the generated hydrogen gas supply pressure is less than the threshold pressure differential of the stored hydrogen gas supply pressure. The regulating at 270 also may include permitting, or automatically permitting, flow of the generated hydrogen gas to the fuel cell stack when the generated hydrogen gas supply pressure is or exceeds the threshold pressure differential greater than the stored hydrogen gas supply pressure. In other words, the regulating at 270 may include automatically permitting flow of the generated hydrogen gas to the fuel cell stack when the generated hydrogen gas supply pressure is greater than the stored hydrogen gas supply pressure by at least the crack pressure of the generated hydrogen gas check valve.

The threshold pressure differential may have any suitable magnitude. As examples, the threshold pressure differential may be at least 0.25 kilopascal (kPa), at least 0.5 kPa, at least 0.75 kPa, at least 1 kPa, at least 2 kPa, at least 3 kPa, at least 4 kPa, or at least 5 kPa, at most 60 kPa, at most 50 kPa, at most 40 kPa, at most 30 kPa, at most 20 kPa, at most 10 kPa, at most 8 kPa, at most 6 kPa, at most 5 kPa, at most 4 kPa, and/or at most 3 kPa.

Methods 200 further include restricting flow of stored hydrogen gas at 275. The restricting at 275 may include ceasing supply of the stored hydrogen gas from the hydrogen storage device to the fuel cell stack. The restricting may be performed utilizing the stored hydrogen gas check valve and/or the stored hydrogen gas flow regulator to restrict or cease flow of the stored hydrogen gas to the fuel cell stack, such as discussed herein in connection with the regulating at 270.

The ceasing may be based upon and/or responsive to any suitable criteria. As examples, the ceasing may be responsive and/or subsequent to the initiating at 265 and/or as a result of the regulating at 270. The restricting at 275 also may be performed responsive to the fuel processor reaching the hydrogen-producing state and/or responsive to the generated hydrogen gas supply pressure reaching and/or exceeding the threshold pressure differential of the stored hydrogen gas supply pressure.

In some examples, methods 200 may include transitioning, or automatically transitioning, from an initial configuration, in which the initial electrical output is being produced solely from stored hydrogen gas, to a subsequent configuration, in which the subsequent electrical output is produced solely from generated hydrogen gas. In some such examples, the transitioning may include immediately transitioning from the initial configuration to the subsequent configuration. In some such examples, the transitioning may include transitioning from the initial configuration to an intermediate configuration and subsequently transitioning from the intermediate configuration to the subsequent configuration. When in the intermediate configuration, the fuel cell stack may generate an intermediate electrical output that is produced from both the stored hydrogen gas and the generated hydrogen gas. In other words, the intermediate electrical output may include both the initial electrical output 42 and the subsequent electrical output 46. This is illustrated in FIG. 1, with intermediate electrical output 44 being provided to energy-consuming device 120 from fuel cell stack 30.

Consuming generated hydrogen gas at 280 may include consuming the generated hydrogen gas with and/or within the fuel cell stack to produce and/or generate a subsequent electrical output from the fuel cell stack. The consuming at 280 may be responsive to and/or a result of the initiating at 265. The consuming at 280 may be performed in a manner that may be similar to the consuming at 240. For example, the consuming at 280 may include providing the oxidant to the fuel cell stack, such as discussed herein for the consuming at 240.

Satisfying the applied load with the subsequent electrical output at 285 may include at least partially, or even completely, satisfying the applied load with the subsequent electrical output from the fuel cell stack. As discussed herein with reference to the consuming at 240, the consuming at 280 may include satisfying the portion of the applied load from energy-consuming device 120, which is illustrated in FIG. 1 with subsequent electrical output 46 being provided from fuel cell stack 30 to energy-consuming device 120.

It is within the scope of the present disclosure that the satisfying at 285 may include satisfying the applied load solely with, or only utilizing, the subsequent electrical output. Stated another way, and subsequent to the startup timeframe and/or subsequent to the threshold startup time, in which stored hydrogen gas may be the only hydrogen gas provided to the fuel cell stack, the HPFCS may transition to supplying only generated hydrogen gas to the fuel cell stack.

It is within the scope of the present disclosure that the hydrogen storage device may be configured to be replenished. With this in mind, and subsequent to the restricting at 275, methods 200 further may include replacing the hydrogen storage device with a new, or with a filled, hydrogen storage device. Additionally or alternatively, methods 200 may include refilling the hydrogen storage device with the generated hydrogen gas, which may be performed by permitting the fuel processor to produce generated hydrogen gas while HPFCS 10 is not satisfying the applied load (e.g., while the primary power source is satisfying the applied load) and directing the generated hydrogen gas to the hydrogen storage device instead of to the fuel cell stack. In such an example, methods 200 further may include pressurizing the generated hydrogen gas to a suitable storage pressure, which may be greater than the stored hydrogen gas supply pressure. This is shown in FIG. 1 with a generated hydrogen gas diverting valve 180 configured to selectively deliver generated hydrogen gas 52 from fuel processor 50 to hydrogen storage device 20 and a compressor 182 configured to selectively compress generated hydrogen gas 52 to the storage pressure. Such a configuration may be suitable for situations in which the HPFCS is in a remote location and/or in which replacement hydrogen storage devices are not readily available.

The hydrogen storage devices of methods 200 and/or hydrogen storage devices 20 of FIG. 1 may include any suitable structure that may be adapted, configured, designed, sized, and/or constructed to contain the volume of stored hydrogen gas and/or to supply, or to selectively supply, the stored hydrogen gas to the fuel cell stack. As examples, the hydrogen storage device may include a hydrogen storage vessel, such as a bottle or tank, and/or a hydride bed.

As discussed, the volume of stored hydrogen gas may be sufficient to operate the HPFCS and/or to satisfy the applied load for at least the threshold initial supply time. For applied loads of approximately 5 kilowatts and HPFCSs configured for threshold initial supply times on the order of 1-10 minutes, examples of the volume of stored hydrogen gas include volumes of at least 100 liters (L), at least 150 L, at least 200 L, at least 250 L, at least 300 L, at least 350 L, at least 400 L, at least 450 L, at least 500 L, at least 600 L, at least 700 L, at least 800 L, at least 900 L, at least 1,000 L, at least 1,500 L, at least 2,000 L, at least 2,500 L, at least 3,000 L; at most 50,000 L, at most 10,000 L, at most 9,000 L, at most 8,000 L, at most 7,000 L, at most 6,000 L, at most 5,000 L, at most 4,000 L, at most 3,000 L, and/or at most 2,000 L of hydrogen gas at standard temperature and pressure.

The hydrogen gas storage capacity of the hydrogen storage device and/or the specific volume of stored hydrogen gas may be selected for a given application, such as may be based, at least in part, on a desired initial electrical output for the fuel cell stack, the magnitude of the applied load, and/or the threshold startup time for the fuel processor. The hydrogen gas storage capacity of the hydrogen storage device and/or the specific volume of stored hydrogen gas also may be selected based upon a desired number of times that a given hydrogen storage device may be utilized prior to containing sufficient hydrogen gas to perform methods 200. In some such examples, the hydrogen storage capacity of the hydrogen storage device and/or the specific volume of stored hydrogen gas may be a threshold multiple of the sufficient volume to at least partially satisfy the applied load during the satisfying at 250 and/or that is consumed during the consuming at 240 of methods 200 for a given system. Examples of the threshold multiple include at least 2, at least 3, at least 4, at least 6, at least 8, at least 10, at most 4, at most 6, at most 8, at most 10, and/or at most 20.

The fuel cell stacks of methods 200 and/or fuel cell stacks 30 of FIG. 1 may include any suitable structure that may be adapted, configured, designed, and/or constructed to receive hydrogen gas, such as the stored hydrogen gas and/or the generated hydrogen gas, and to generate the electrical output, such as the initial electrical output and/or the subsequent electrical output, from the hydrogen gas and an oxidant. As an example, and as illustrated in FIG. 1, fuel cell stacks 30 may include an anode 32, a cathode 34, and an ion-permeable isolation structure 36. Ion-permeable isolation structure 36 may isolate, may fluidly isolate, and/or may electrically isolate anode 32 from cathode 34. In such a configuration, hydrogen gas, such as stored hydrogen gas 24 and/or generated hydrogen gas 52, may be provided to anode 32, and oxidant 38 may be provided to cathode 34. The hydrogen gas may dissociate, at anode 32, into protons and electrons. The protons may diffuse through ion-permeable isolation structure 36 to cathode 34 and react with oxidant 38 therein. The electrons may travel through energy-consuming device 120 as electrical output 40 before reuniting with the protons and the oxidant within cathode 34.

In some examples, ion-permeable isolation structure 36 may include and/or be a hydrocarbon membrane and/or an ion-permeable polymer membrane, such as a sulfonated tetrafluoroethylene-based fluoropolymer. In such a configuration, the fuel cell stack also may be referred to herein as and/or may be a polymer electrolyte membrane fuel cell stack. Some fuel cell stacks are configured to operate at temperatures below 100° C. and thus may be referred to as low temperature fuel cell stacks. Others, including other polymer electrolyte membrane fuel cells stacks, are configured to operate at temperatures greater than 100° C. and thus may be referred to as high temperature fuel cell stacks. Additional examples of high temperature fuel cell stacks include solid-oxide fuel cell (SOFC) stacks, molten carbonate fuel cell (MCFC) stacks, and phosphoric acid fuel cell (PAFC) stacks.

The reforming region of methods 200 and/or reforming region 60 of FIG. 1 may include any suitable structure and/or may utilize any suitable process that generates hydrogen gas and/or the mixed gas stream from the one or more feed streams. As an example, the reforming region may utilize a steam reforming process and/or may be referred to herein as a steam reformer. Steam reformers typically operate at temperatures in the range of 200° C. and 900° C., and at pressures in the range of 50 psi and 300 psi, although temperatures and pressures outside of this range are within the scope of the disclosure. When the carbon-containing feedstock is methanol, the hydrogen-producing steam reforming reaction will typically operate in a temperature range of approximately 200-500° C. Illustrative subsets of this range include 350-450° C., 375-425° C., and 375-400° C. When the carbon-containing feedstock is a hydrocarbon, ethanol, or a similar alcohol, a temperature range of approximately 400-900° C. will typically be used for the steam reforming reaction. Illustrative subsets of this range include 750-850° C., 725-825° C., 650-750° C., 700-800° C., 700-900° C., 500-800° C., 400-600° C., and 600-800° C. As another example, the reforming region may utilize an autothermal reforming process and/or may be referred to herein as an autothermal reformer.

The heating assembly of methods 200 and/or heating assembly 70 of FIG. 1 may include any suitable structure that may be adapted, configured, designed, and/or constructed to heat the reforming region to within the hydrogen-producing temperature range, and optionally to maintain the reforming region in the thermally primed state. The heating assembly of methods 200 and/or heating assembly 70 of FIG. 1 also may be configured to heat the purification assembly to, and/or to maintain the purification assembly in, the thermally primed state. As mentioned, heating assembly 70 may include electrical heating assembly 172 that may utilize electric current from the primary power source to maintain at least the reforming region in the thermally primed state. More specific examples of electrical heating assembly 172 include resistive heating assemblies and/or inductive heating assemblies. Heating assembly 70 additionally or alternatively may include burner assembly 171 or a combustion heating assembly that may burn a fuel to heat the reforming region. In a specific example, the fuel may include and/or be byproduct stream 74 of FIG. 1.

The purification assembly of methods 200 and/or purification assembly 72 of FIG. 1 may include any suitable structure that may be adapted, configured, designed, and/or constructed to receive the mixed gas stream, to purify the mixed gas stream, and/or to separate the mixed gas stream into the purified hydrogen stream and the byproduct stream. Examples of purification assemblies 72 include membrane-based separation assemblies, platinum membrane-based separation assemblies, palladium membrane-based separation assemblies, and/or pressure swing adsorption assemblies.

Examples of suitable fuel processors 50, including reforming regions 60, heating assemblies 70, purification assemblies 72, feed streams 61, hydrogen storage devices 20, fuel cell stacks 30, electrical energy storage devices 86, primary power sources 100, and/or energy-consuming devices 120 are disclosed in U.S. Pat. Nos. 10,476,093, 7,659,019, and 7,972,420, and PCT Patent Application Publication No. WO2016178849, the complete disclosures of which are hereby incorporated by reference herein.

The buffer tanks of methods 200 and/or buffer tanks 78 of FIG. 1 may include any suitable structure that may be adapted, configured, designed, sized, and/or constructed to contain and/or house a volume of generated hydrogen gas. An example of the buffer tank includes a pressure tank. The buffer tank, when present, may have any suitable buffer tank volume, examples of which include buffer tank volumes of at least 2 liters, at least 4 liters, at least 6 liters, at least 8 liters, at least 10 liters, at least 12 liters, at least 14 liters, at least 16 liters, at least 18 liters, at least 20 liters, at most 40 liters, at most 35 liters, at most 30 liters, at most 25 liters, at most 20 liters, and/or at most 15 liters.

The primary power detectors of methods 200 and/or primary power detectors 80 of FIG. 1 may include any suitable structure that may be adapted, configured, designed, and/or constructed to detect the inability of the primary power source to satisfy the applied load. Examples of the detectors include a voltage detector, a volt meter, an electric current detector, and/or an electric current meter.

The electrical energy storage device of methods 200 and/or electrical energy storage device 86 of FIG. 1 may include any suitable structure that may store electrical energy and/or that may selectively provide the stored electrical current to the applied load and/or the energy-consuming device. Examples of electrical energy storage devices that may be or may be included in the electrical energy storage device of the present disclosure include one or more of any suitable battery, capacitor, supercapacitor, ultracapacitor, and/or fly wheel.

As discussed in more detail herein, conventional HPFCSs that are utilized for backup power applications often will include electrical energy storage devices, and the electrical energy storage devices may be utilized to provide the stored electrical current when other sources of electric current, such as the primary power source and/or the fuel cell stack, are unable to do so. Methods 200, which are disclosed herein with reference to FIG. 2, and/or HPFCS 10 discussed herein with reference to FIG. 1, decrease an overall timeframe during which the electrical energy storage device must provide the stored electrical current and/or decrease a needed storage capacity for the electrical energy storage device when compared to conventional HPFCSs and/or conventional methods of operating conventional HPFCSs, and more specifically those which do not include utilizing stored hydrogen gas. With this in mind, an overall storage capacity of the electrical energy storage device utilized in HPFCS 10 and/or with methods 200 according to the present disclosure may be less than a threshold fraction of a comparable overall energy storage capacity of a comparable, or conventional, electrical energy storage device of a comparable, or conventional, HPFCS that does not include the hydrogen storage device and/or that does not perform methods 200. Examples of the threshold fraction of the comparable overall energy storage capacity is less than 50%, less than 40%, less than 30%, less than 20%, or less than 10% of the comparable overall energy storage capacity. The threshold fraction of the comparable overall energy storage capacity additionally or alternatively may be a ratio of any of the threshold initial supply times discussed herein to any of the threshold startup times discussed herein.

As more specific examples, electrical energy storage device 86 of HPFCS 10 and/or the electrical energy storage device utilized with methods 200 may include an overall energy storage capacity of at least 5 amp hour (A h), at least 10 A h, at least 15 A h, at least 20 A h, at least 25 A h, at least 30 A h, at least 35 A h, at least 40 A h, at least 45 A h, at least 50 A h, at least 55 A h, at least 60 A h, at most 10 A h, at most 15 A h, at most 20 A h, at most 25 A h, at most 30 A h, at most 35 A h, at most 40 A h, at most 45 A h, at most 50 A h, at most 55 A h, at most 60 A h, at most 65 A h, at most 70 A h, at most 80 A h, at most 90 A h, and/or at most 100 A h.

The electrical energy storage device included in and/or utilized by a comparable, or conventional, HPFCS that does not include hydrogen storage device 20 and/or that does not perform methods 200, may require at least one, and typically a plurality of, batteries due to the relatively large energy storage capacity of a battery as compared to other types of electrical energy storage devices. Due to the lower overall energy storage capacity requirement of the energy storage device in HPFCS 10 and/or that utilized in methods 200, the electrical energy storage device 86 of HPFCS 10 and/or that utilized in methods 200 may not include any batteries and/or may only utilize electrical energy storage devices other than batteries, for example, any suitable combination of one or more of the electrical energy storage devices discussed herein other than batteries.

For examples in which HPFCS 10 is configured for black start and/or in which methods 200 include maintaining the energy-consuming device in an unpowered state prior to supply of the initial electrical output to the energy-consuming device, the electrical energy storage device of the HPFCS may only include and/or require an energy storage capacity that is sufficient to power the components of the HPFCS during the threshold initial supply time, with examples of such components including controller 90, stored hydrogen gas flow control valve 28, and/or stored hydrogen gas pressure detector 121. In such examples, electrical energy storage device 86 may include a capacitor and/or a plurality of capacitors.

As illustrated in dashed lines in FIG. 1, HPFCS 10 may include a controller 90. Controller 90, when present, may be adapted, configured, and/or programmed to control the operation of at least a portion of HPFCS 10. As examples, and as illustrated in dotted lines in FIG. 1, controller 90 may be programmed to send one or more control signals 92 to one or more components of HPFCS 10, such as stored hydrogen gas pressure regulator 26, stored hydrogen gas flow control valve 28, generated hydrogen gas flow control valve 54, and/or generated hydrogen gas pressure regulator 56, to control the operation thereof. In some examples, controller 90 also is in communication with and configured to receive detector signals 93 from one or more detectors of HPFCS 10. Examples of such detectors include stored hydrogen gas pressure detector 121, generated hydrogen gas flow detector 176, and/or generated hydrogen gas pressure detector 178. In such examples, controller 90, may be adapted, configured, and/or programmed to control the operation of the one or more corresponding components of the HPFCS responsive to receipt of a detector signal 93, and/or based upon the information conveyed in the detector signal, such as discussed herein with reference to FIG. 1 and HPFCS 10 and/or with reference to FIG. 2 and methods 200. As an example, controller 90 may be configured to receive a detector signal 93 from stored hydrogen gas pressure detector 121, determine the volume and/or pressure of stored hydrogen gas 24 in hydrogen storage device 20 based on the detector signal 93, and selectively open stored hydrogen gas flow control valve 28 when the volume and/or pressure of stored hydrogen gas 24 in hydrogen storage device 20 is adequate to satisfy the applied load during the threshold startup time and/or the startup timeframe.

Controller 90 may include and/or be any suitable structure, device, and/or devices that may be adapted, configured, designed, constructed, and/or programmed to perform the functions discussed herein. As examples, controller 90 may include one or more of an electronic controller, a dedicated controller, a special-purpose controller, a personal computer, a special-purpose computer, a display device, a logic device, a memory device, and/or a memory device having computer-readable storage media.

The computer-readable storage media, when present, also may be referred to herein as non-transitory computer readable storage media. This non-transitory computer readable storage media may include, define, house, and/or store computer-executable instructions, programs, and/or code. These computer-executable instructions may direct HPFCS 10 and/or controller 90 thereof to perform any suitable portion, or subset, of methods 200. Examples of such non-transitory computer-readable storage media include CD-ROMs, disks, hard drives, flash memory, etc. As used herein, storage, or memory, devices and/or media having computer-executable instructions, as well as computer-implemented methods and other methods according to the present disclosure, are considered to be within the scope of subject matter deemed patentable in accordance with Section 101 of Title 35 of the United States Code.

The check valves of methods 200, generated hydrogen gas check valve 76, and/or stored hydrogen gas check valve 77 of FIG. 1 may include any suitable structure that may be adapted, configured, designed, and/or constructed to permit fluid flow in a first direction, such as from the fuel processor to the fuel cell stack, and to resist, or block, fluid flow in a second direction that is opposed to the first direction, such as from the hydrogen storage device and/or from the fuel cell stack to the fuel processor. An example of the check valve includes a ball and seat check valve, a diaphragm check valve, a stop check valve, a two-way check valve, and/or a three-way check valve.

The check valves, when present, may be configured to have a relatively low crack pressure. Examples of the crack pressure include crack pressures of at least 0.25 kilopascal (kPa), at least 0.5 kPa, at least 0.75 kPa, at least 1 kPa, at least 2 kPa, at least 3 kPa, at least 4 kPa, or at least 5 kPa, at most 60 kPa, at most 50 kPa, at most 40 kPa, at most 30 kPa, at most 20 kPa, at most 10 kPa, at most 8 kPa, at most 6 kPa, at most 4 kPa, or at most 2 kPa.

The pressure regulators of methods 200, and/or the pressure regulators of FIG. 1 including stored hydrogen gas pressure regulator 26 and/or the generated hydrogen gas pressure regulator 56, may include any suitable structure that may be adapted, configured, designed, and/or constructed to control and/or regulate the pressure of the corresponding fluid as supplied to the fuel cell stack. Similarly, the pressure regulators of FIG. 1, including stored hydrogen gas pressure regulator 26 and/or generated hydrogen gas pressure regulator 56, may include any suitable structure that may be adapted, configured, designed, and/or constructed to control and/or regulate the pressure of the corresponding fluid as supplied to the fuel cell stack. An example of the pressure regulators includes a pressure reduction regulator.

The primary power sources of methods 200 and/or primary power sources 100 of FIG. 1 may include any suitable structure that may be configured to satisfy the applied load. Examples of the primary power source include an AC primary power source, a DC primary power source, an electrical grid, and/or a generator.

The energy-consuming device of methods 200 and/or energy-consuming device 120 of FIG. 1 may include any suitable structure that may be adapted, configured, designed, and/or constructed to receive electrical energy from the primary power source, to receive electrical energy from the HPFCS, to apply at least a portion of the applied load to the primary power source, and/or to apply at least a portion of the applied load to the HPFCS. In some examples, the energy-consuming devices may include remotely installed devices that may be a significant distance from cities and/or maintenance crews. In a more specific example, the energy-consuming devices may include telecommunications equipment, such as a cellular phone tower. In another specific example, the energy-consuming devices may include emergency communications equipment, including terrestrial trunked radio systems, base stations, switches, and/or microwave towers. Additional examples of energy-consuming devices include signaling and communications equipment, hospital and life-support equipment, surveillance equipment, radios, battery chargers, one or more households, one or more residences, one or more office buildings, and/or one or more neighborhoods.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

Illustrative, non-exclusive examples of hydrogen-producing fuel cell systems and methods of operating hydrogen-producing fuel cell systems according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A1. A method of initiating operation of a hydrogen-producing fuel cell system (HPFCS), the method comprising:
detecting an inability of a primary power source to satisfy an applied load;
responsive to the detecting, initiating supply of stored hydrogen gas from a hydrogen storage device of the HPFCS to a fuel cell stack of the HPFCS, consuming the stored hydrogen gas with the fuel cell stack to produce an initial electrical output from the fuel cell stack, and at least partially satisfying the applied load with the initial electrical output;
initiating startup of a fuel processor of the HPFCS; and
subsequent to at least a threshold startup time for the fuel processor, initiating supply of generated hydrogen gas from the fuel processor to the fuel cell stack, consuming the generated hydrogen gas with the fuel cell stack to produce a subsequent electrical output from the fuel cell stack, and at least partially satisfying the applied load with the subsequent electrical output.

A2. The method of paragraph A1, wherein the detecting includes detecting a decrease in a monitored voltage.

A3. The method of paragraph A2, wherein the monitored voltage is at least one of:
(i) a primary voltage of the primary power source configured to provide a primary electric current to the applied load;
(ii) a grid voltage of an electrical grid configured to provide a grid electric current to the applied load; and
(iii) an energy storage device voltage of an electrical energy storage device configured to provide stored electrical current to the applied load.

A4. The method of any of paragraphs A2-A3, wherein the detecting the decrease in the monitored voltage includes detecting a voltage decrease of at least one of:
(i) at least 0.5 volts, at least 1 volt, at least 1.5 volts, at least 2 volts, at least 2.5 volts, at least 3 volts, at least 4 volts, or at least 5 volts; and
(ii) at most 10 volts, at most 9 volts, at most 8 volts, at most 7 volts, at most 6 volts, at most 5 volts, at most 4 volts, or at most 3 volts.

A5. The method of any of paragraphs A1-A4, wherein the hydrogen storage device includes a volume of stored hydrogen gas, and further wherein the initiating supply of stored hydrogen gas includes flowing a portion of the volume of stored hydrogen gas from the hydrogen storage device to the fuel cell stack.

A6. The method of paragraph A5, wherein the volume of stored hydrogen gas has a magnitude of at least one of:
(i) at least 100 liters (L), at least 150 L, at least 200 L, at least 250 L, at least 300 L, at least 350 L, at least 400 L, at least 450 L, at least 500 L, at least 600 L, at least 700 L, at least 800 L, at least 900 L, at least 1,000 L, at least 1,500 L, at least 2,000 L, at least 2,500 L, or at least 3,000 L; and
(ii) at most 50,000 L, at most 10,000 L, at most 9,000 L, at most 8,000 L, at most 7,000 L, at most 6,000 L, at most 5,000 L, at most 4,000 L, at most 3,000 L, or at most 2,000 L.

A7. The method of any of paragraphs A1-A6, wherein the hydrogen storage device includes a hydrogen storage bottle.

A8. The method of any of paragraphs A1-A7, wherein the initiating supply of stored hydrogen gas includes providing the stored hydrogen gas to the fuel cell stack at a stored hydrogen gas supply pressure.

A9. The method of any of paragraphs A1-A8, wherein the fuel cell stack includes an anode, a cathode, and an ion-permeable isolation structure that fluidly isolates the anode from the cathode, wherein the initiating supply of stored hydrogen gas includes providing the stored hydrogen gas to the anode of the fuel cell stack, and wherein the initiating supply of generated hydrogen gas includes providing the generated hydrogen gas to the anode of the fuel cell stack.

A10. The method of paragraph A9, wherein the method further includes providing an oxidant to the cathode, optionally wherein the oxidant includes at least one of air and oxygen gas.

A11. The method of any of paragraphs A1-A10, wherein the applied load is from one or more of the HPFCS and one or more energy-consuming devices.

A12. The method of any of paragraphs A1-A11, wherein the initiating the startup of the fuel processor is performed at least partially concurrently with the consuming the stored hydrogen gas with the fuel cell stack to produce the initial electrical output.

A13. The method of paragraph A12, wherein the initiating the startup of the fuel processor includes utilizing a portion of the initial electrical output to power one or more components of the fuel processor.

A14. The method of any of paragraphs A1-A13, wherein the at least partially satisfying the applied load with the initial electrical output includes satisfying the applied load solely with the initial electrical output.

A15. The method of any of paragraphs A1-A14, wherein the at least partially satisfying the applied load with the initial electrical output includes at least partially satisfying the applied load with the initial electrical output during a startup timeframe that includes the threshold startup time and in which the stored hydrogen gas is the only hydrogen gas provided to the fuel cell stack.

A16. The method of any of paragraphs A1-A15, wherein the method further includes at least partially satisfying the applied load with the initial electrical output within a threshold initial supply time.

A17. The method of paragraph A16, wherein the initial supply time is at least one of:
(i) at least 5 seconds (s), at least 10 s, at least 15 s, at least 20 s, at least 25 s, at least 30 s, at least 35 s, at least 40 s, or at least 45 s; and
(ii) at most 120 s, at most 110 s, at most 100 s, at most 90 s, at most 80 s, at most 70 s, at most 60 s, at most 50 s, at most 40 s, at most 30 s, or at most 20 s.

A18. The method of any of paragraphs A16-A17, wherein the initial supply time is less than a threshold fraction of the threshold startup time for the fuel processor, optionally wherein the threshold fraction is less than 80%, less than 70%, less than 60%, less than 50%, less than 40%, less than 30%, less than 25%, less than 20%, less than 15%, less than 10%, or less than 5% of the threshold startup time for the fuel processor.

A19. The method of any of paragraphs A1-A18, wherein the initiating startup of the fuel processor includes at least one of:
(i) initiating supply of a carbon-containing feedstock to a reforming region of the fuel processor; and
(ii) initiating supply of methanol and water to the reforming region.

A20. The method of any of paragraphs A1-A19, wherein the initiating startup of the fuel processor includes heating a/the reforming region of the fuel processor to a hydrogen-producing temperature range.

A21. The method of any of paragraphs A1-A20, wherein the fuel processor is a thermally primed fuel processor, wherein the method further includes maintaining the fuel processor at a thermally primed temperature prior to the detecting.

A22. The method of paragraph A21, wherein the thermally primed temperature is at least one of:
(i) at least 50%, at least 55%, at least 60%, at least 65%, at least 70%, at least 75%, at least 80%, at least 85%, at least 90%, or at least 95% of a lower value of the hydrogen-producing temperature range as measured in degrees Celsius;
(ii) at most 100%, at most 95%, at most 90%, at most 85%, at most 80%, or at most 75% of an upper value of the hydrogen-producing temperature range as measured in degrees Celsius; and
(iii) within the hydrogen-producing temperature range.

A23. The method of any of paragraphs A21-A22, wherein the hydrogen-producing temperature range is at least one of:
(i) at least 200 degrees Celsius (° C.), at least 225° C., at least 250° C., at least 275° C., at least 300° C., at least 325° C., at least 350° C., at least 375° C., at least 400° C., at least 425° C., at least 450° C., at least 475° C., at least 500° C., at least 525° C., at least 550° C., at least 575° C., at least 600° C., at least 625° C., at least 650° C., at least 675° C., at least 700° C., at least 725° C., or at least 750° C.; and
(ii) at most 900° C., at most 875° C., at most 850° C., at most 825° C., at most 800° C., at most 775° C., at most 750° C., at most 725° C., at most 700° C., at most 675° C., at most 650° C., at most 625° C., at most 600° C., at most 575° C., at most 550° C., at most 525° C., at most 500° C., at most 475° C., at most 450° C., at most 425° C., or at most 400° C.

A24. The method of any of paragraphs A21-A22, wherein the initiating startup of the fuel processor includes increasing a temperature of the fuel processor from a thermally primed temperature to a/the hydrogen-producing temperature range.

A25. The method of any of paragraphs A1-A24, wherein the fuel processor includes a purification assembly, wherein the method includes purifying the generated hydrogen gas with the purification assembly to generate purified hydrogen gas, and further wherein the initiating supply of generated hydrogen gas to the fuel cell stack includes initiating supply of the purified hydrogen gas to the fuel cell stack.

A26. The method of any of paragraphs A1-A25, wherein the initiating supply of generated hydrogen gas includes initiating the supply of generated hydrogen gas responsive to the fuel processor reaching a hydrogen-producing state in which a generated hydrogen gas flow rate of the generated hydrogen gas is sufficient to satisfy the applied load.

A27. The method of any of paragraphs A1-A26, wherein the initiating the supply of generated hydrogen gas includes initiating the supply of generated hydrogen gas responsive to a generated hydrogen gas supply pressure of the generated hydrogen gas exceeding a/the stored hydrogen gas supply pressure at which the stored hydrogen gas is provided to the fuel cell stack.

A28. The method of any of paragraphs A1-A27, wherein the threshold startup time is at least one of:
(i) at least 30 seconds, at least 1 minute, at least 1.5 minutes, at least 2 minutes, at least 2.5 minutes, at least 3 minutes, at least 3.5 minutes, at least 4 minutes, at least 4.5 minutes, or at least 5 minutes; and
(ii) at most 30 minutes, at most 25 minutes, at most 20 minutes, at most 15 minutes, at most 10 minutes, at most 9 minutes, at most 8 minutes, at most 7 minutes, at most 6 minutes, at most 5 minutes, at most 4 minutes, or at most 2 minutes.

A29. The method of any of paragraphs A1-A28, wherein the at least partially satisfying the applied load with the subsequent electrical output includes satisfying the applied load solely with the subsequent electrical output.

A30. The method of any of paragraphs A1-A29, wherein the at least partially satisfying the applied load with the subsequent electrical output includes at least partially satisfying the applied load with the subsequent electrical output subsequent to a/the startup timeframe in which the stored hydrogen gas is the only hydrogen gas provided to the fuel cell stack.

A31. The method of any of paragraphs A1-A30, wherein the method further includes ceasing the supply of stored hydrogen gas from the hydrogen storage device to the fuel cell stack.

A32. The method of paragraph A31, wherein the ceasing is at least one of:
(i) subsequent to the initiating the supply of generated hydrogen gas; and
(ii) responsive to the initiating the supply of generated hydrogen gas.

A33. The method of any of paragraphs A31-A32, wherein, subsequent to the ceasing, the method further includes at least one of:
(i) replacing the hydrogen storage device with a filled hydrogen storage device; and
(ii) refilling the hydrogen storage device with the generated hydrogen gas.

A34. The method of any of paragraphs A1-A33, wherein the HPFCS further includes an electrical energy storage device configured to selectively provide a stored electrical current to the applied load.

A35. The method of paragraph A34, wherein, responsive to the detecting, the method further includes initiating supply of the stored electrical current to the applied load.

A36. The method of paragraph A35, wherein the initiating the supply of the stored electrical current to the applied load is at least partially concurrent with the initiating the supply of stored hydrogen gas from the hydrogen storage device to the fuel cell stack.

A37. The method of A36, wherein the HPFCS comprises a stored hydrogen gas flow control valve configured to selectively permit or block flow of the stored hydrogen gas to the fuel cell stack, and wherein the initiating the supply of the stored electrical current comprises utilizing a portion of the stored electrical current to open the stored hydrogen gas flow control valve and to permit flow of the stored hydrogen gas to the fuel cell stack.

A38. The method of any of paragraphs A35-A37, wherein the electrical energy storage device includes at least one of:
(i) at least one battery;
(ii) at least one capacitor;
(iii) at least one super capacitor; and
(iv) at least one fly wheel.

A39. The method of paragraph A38, wherein the electrical energy storage device does not include the at least one battery.

A40. The method of any of paragraphs A34-A39, wherein an overall storage capacity of the electrical energy storage device is less than a threshold fraction of a comparable overall energy storage capacity of a comparable electrical energy storage device of a comparable HPFCS that does not include the hydrogen storage device, optionally wherein the threshold fraction of the comparable overall energy storage capacity is less than 50%, less than 40%, less than 30%, less than 20%, or less than 10%.

A41. The method of any of paragraphs A1-A40, wherein the method further includes regulating a/the stored hydrogen gas supply pressure at which the stored hydrogen gas is supplied to the fuel cell stack.

A42. The method of paragraph A41, wherein the regulating the stored hydrogen gas supply pressure includes utilizing a stored hydrogen gas pressure regulator of the HPFCS.

A43. The method of any of paragraphs A1-A42, wherein the method further includes regulating a/the generated hydrogen gas supply pressure at which the generated hydrogen gas is supplied to the fuel cell stack.

A44. The method of paragraph A43, wherein the regulating the generated hydrogen gas supply pressure includes utilizing a generated hydrogen gas pressure regulator and/or a generated hydrogen gas check valve of the HPFCS.

A45. The method of any of paragraphs A41-A44, wherein the regulating the generated hydrogen gas supply pressure includes ensuring that the generated hydrogen gas supply pressure is at least a threshold pressure differential greater than a/the stored hydrogen gas supply pressure.

A46. The method of paragraph A45, wherein the threshold pressure differential is at least one of:
(i) at least 0.25 kilopascal (kPa), at least 0.5 kPa, at least 0.75 kPa, at least 1 kPa, at least 2 kPa, at least 3 kPa, at least 4 kPa, or at least 5 kPa; and
(ii) at most 60 kPa, at most 50 kPa, at most 40 kPa, at most 30 kPa, at most 20 kPa, at most 10 kPa, at most 8 kPa, at most 6 kPa, at most 5 kPa, at most 4 kPa, or at most 3 kPa.

A47. The method of any of paragraphs A1-A46, wherein the method further includes restricting flow of the stored hydrogen gas to the fuel processor.

A48. The method of paragraph A47, wherein the restricting includes utilizing a/the generated hydrogen gas check valve to restrict flow of the stored hydrogen gas to the fuel processor.

A49. The method of any of paragraphs A1-A48, wherein the HPFCS further includes a buffer tank, and further wherein the method includes storing a volume of the generated hydrogen gas in the buffer tank prior to supply of the generated hydrogen gas to the fuel cell stack.

A50. The method of any of paragraphs A1-A49, wherein the method further includes automatically transitioning from an initial configuration, in which the initial electrical output is solely produced from the stored hydrogen gas, to a subsequent configuration, in which the subsequent electrical output is solely produced from generated hydrogen gas.

A51. The method of paragraph A50, wherein the automatically transitioning includes immediately transitioning from the initial configuration to the subsequent configuration.

A52. The method of any of paragraphs A50-A51, wherein the automatically transitioning includes transitioning from the initial configuration to an intermediate configuration and subsequently transitioning from the intermediate configuration to the subsequent configuration, wherein, when in the intermediate configuration, the fuel cell stack generates an intermediate electrical output that is produced from both the stored hydrogen gas and the generated hydrogen gas.

A53. The method of any of paragraphs A1-A52, wherein, prior to the initiating the supply of stored hydrogen gas, the method further includes determining that the volume of stored hydrogen gas included in the hydrogen storage device is sufficient to provide the stored hydrogen gas to the fuel cell stack for at least the threshold startup time for the fuel processor, optionally at a stored hydrogen gas flow rate that is sufficient to at least partially satisfy the applied load.

A54. The method of paragraph A53, wherein, responsive to the determining, the method further includes selectively permitting the fuel cell stack to produce the initial electrical output.

A55. The method of any of paragraphs A1-A54, wherein at least a portion of the applied load is from an energy-consuming device, and wherein the detecting includes detecting an absence of a primary electrical output to the energy-consuming device from the primary power source.

A56. The method of paragraph A55, wherein the method further includes maintaining the energy-consuming device in an unpowered state subsequent to the detecting and prior to supply of the initial electrical output to the energy-consuming device from the fuel cell stack.

A57. The method of paragraph A56, wherein the method further includes starting up the energy-consuming device responsive to receipt of the initial electrical output from the fuel cell stack.

A58. The method of any of paragraphs A1-A57, wherein the HPFCS is the HPFCS of any of paragraphs B1-B47.

B1. A hydrogen-producing fuel cell system (HPFCS), comprising:
a fuel cell stack configured to receive an oxidant and hydrogen gas and to generate an electrical output from the oxidant and hydrogen gas;
a fuel processor configured to receive one or more feed streams and to react the one or more feed streams to produce generated hydrogen gas; and
a hydrogen storage device configured to store a volume of stored hydrogen gas;
wherein the fuel cell stack is configured to at least partially satisfy an applied load with the electrical output when a primary power source that normally is adapted to satisfy the applied load is not providing a primary electrical output to satisfy the applied load, wherein the HPFCS is configured to detect an inability of the primary power source to satisfy the applied load, and wherein responsive to a detection of the inability of the primary power source to satisfy the applied load, the HPFCS is configured to:
initiate a startup of the fuel processor;
supply the stored hydrogen gas to the fuel stack to produce an initial electrical output from the stored hydrogen gas during the startup of the fuel processor and to at least partially satisfy the applied load with the initial electrical output; and
supply the generated hydrogen gas to the fuel cell stack to produce a subsequent electrical output from the generated hydrogen gas when the fuel processor reaches a hydrogen-producing state from the startup and to at least partially satisfy the applied load with the subsequent electrical output.

B2. The HPFCS of paragraph B1, wherein the fuel processor comprises a reforming region that contains a reforming catalyst, wherein the reforming region is configured to receive the one or more feed streams and produce from the one or more feed streams a mixed gas stream containing the generated hydrogen gas as a majority component.

B3. The HPFCS of paragraph B2, wherein the one or more feed streams include water and a carbon-containing feedstock.

B4. The HPFCS of any of paragraphs B2-B3, wherein the reforming region is configured to produce the mixed gas stream from the one or more feed streams when the reforming region is heated to within a hydrogen-producing temperature range.

B5. The HPFCS of paragraph B4, wherein the hydrogen-producing temperature range is at least one of:
(i) at least 200 degrees Celsius (° C.), at least 225° C., at least 250° C., at least 275° C., at least 300° C., at least 325° C., at least 350° C., at least 375° C., at least 400° C., at least 425° C., at least 450° C., at least 475° C., at least 500° C., at least 525° C., at least 550° C., at least 575° C., at least 600° C., at least 625° C., at least 650° C., at least 675° C., at least 700° C., at least 725° C., or at least 750° C.; and
(ii) at most 900° C., at most 875° C., at most 850° C., at most 825° C., at most 800° C., at most 775° C., at most 750° C., at most 725° C., at most 700° C., at most 675° C., at most 650° C., at most 625° C., at most 600° C., at most 575° C., at most 550° C., at most 525° C., at most 500° C., at most 475° C., at most 450° C., at most 425° C., or at most 400° C.

B6. The HPFCS of any of paragraphs B2-B5, further comprising a heating assembly configured to maintain the reforming region within the hydrogen-producing temperature range.

B7. The HPFCS of paragraph B6, wherein the heating assembly is configured to maintain the reforming region at or above a thermally primed temperature when the reforming region is not receiving the one or more feed streams.

B8. The HPFCS of paragraph B7, wherein the thermally primed temperature is at least one of:
(i) at least 50%, at least 55%, at least 60%, at least 65%, at least 70%, at least 75%, at least 80%, at least 85%, at least 90%, or at least 95% of a lower value of the hydrogen-producing temperature range as measured in degrees Celsius;
(ii) at most 100%, at most 95%, at most 90%, at most 85%, at most 80%, or at most 75% of an upper value of the hydrogen-producing temperature range as measured in degrees Celsius; and
(iii) within the hydrogen-producing temperature range.

B9. The HPFCS of any of paragraphs B2-B8, wherein the fuel processor further comprises a purification assembly that is configured to receive the mixed gas stream from the reforming region and to separate the mixed gas stream into a purified hydrogen stream and a byproduct stream, and wherein the purified hydrogen stream includes the generated hydrogen gas.

B10. The HPFCS of any of paragraphs B1-B9, further comprising a buffer tank configured to receive the generated hydrogen gas from the fuel processor and to contain a buffer volume of the generated hydrogen gas received from the fuel processor.

B11. The HPFCS of any of paragraphs B1-B10, further comprising a feedstock delivery system configured to selectively deliver the one or more feed streams to the fuel processor from one or more feed stream supplies.

B12. The HPFCS of any of paragraphs B1-B11, further comprising a stored hydrogen gas flow control valve configured to selectively permit or block flow of the stored hydrogen gas to the fuel cell stack, and wherein the HPFCS is configured to open the stored hydrogen gas flow control valve to permit flow of the stored hydrogen gas to the fuel cell stack responsive to the detection of the inability of the primary power source to satisfy the applied load.

B13. The HPFCS of any of paragraphs B1-B12, wherein the HPFCS is configured to produce the initial electrical output from the stored hydrogen gas within a threshold initial supply time from the detection of the inability of the primary power source to satisfy the applied load, and wherein the HPFCS is configured to produce the subsequent electrical output from the generated hydrogen gas within at least a threshold startup time from the detection of the inability of the primary power source to satisfy the applied load.

B14. The HPFCS of paragraph B13, wherein the threshold initial supply time is at least one of:
(i) at least 5 seconds (s), at least 10 s, at least 15 s, at least 20 s, at least 25 s, at least 30 s, at least 35 s, at least 40 s, or at least 45 s; and
(ii) at most 120 s, at most 110 s, at most 100 s, at most 90 s, at most 80 s, at most 70 s, at most 60 s, at most 50 s, at most 40 s, at most 30 s, or at most 20 s.

B15. The HPFCS of any of paragraphs B1-B14 wherein the HPFCS is configured to supply the one or more feed streams to the fuel processor during the startup of the fuel processor.

B16. The HPFCS of any of paragraphs B1-B15, wherein the HPFCS is configured to heat a/the reforming region of the fuel processor to within a/the hydrogen-producing temperature range during the startup of the fuel processor.

B17. The HPFCS of any of paragraphs B1-B16, wherein the fuel processor produces the generated hydrogen gas during the startup of the fuel processor.

B18. The HPFCS of any of paragraphs B1-B17, wherein the fuel processor produces the generated hydrogen gas with a generated hydrogen gas flow rate, and wherein the fuel processor reaches the hydrogen-producing state when the generated hydrogen gas flow rate is at least a threshold minimum generated hydrogen flow rate that is sufficient to satisfy the applied load.

B19. The HPFCS of paragraph B18, wherein the generated hydrogen flow rate is a flow rate of a/the purified hydrogen stream.

B20. The HPFCS of any of paragraphs B1-B19, wherein the fuel processor produces the generated hydrogen gas with a generated hydrogen gas supply pressure, wherein the generated hydrogen gas supply pressure increases during the startup of the fuel processor, and wherein the fuel processor reaches the hydrogen-producing state when the generated hydrogen gas supply pressure exceeds a stored hydrogen gas supply pressure at which the stored hydrogen gas is supplied to the fuel cell stack.

B21. The HPFCS of paragraph B20, wherein the fuel processor reaches the hydrogen-producing state when the generated hydrogen gas supply pressure is a threshold pressure differential greater than the stored hydrogen gas supply pressure, and wherein the threshold pressure differential includes at least one of at least 0.25 kilopascal (kPa), at least 0.5 kPa, at least 0.75 kPa, at least 1 kPa, at least 2 kPa, at least 3 kPa, at least 4 kPa, or at least 5 kPa, at most 60 kPa, at most 50 kPa, at most 40 kPa, at most 30 kPa, at most 20 kPa, at most 10 kPa, at most 8 kPa, at most 6 kPa, at most 5 kPa, at most 4 kPa, and at most 3 kPa.

B22. The HPFCS of paragraph B21, further comprising a generated hydrogen gas check valve configured to selectively permit supply of the generated hydrogen gas to the fuel cell stack when the generated hydrogen gas supply pressure exceeds or is the threshold pressure differential greater than the stored hydrogen gas supply pressure and to prevent flow of the generated hydrogen gas to the fuel cell stack when the generated hydrogen gas supply pressure is less than the stored hydrogen gas supply pressure or is less than the threshold pressure differential greater than the stored hydrogen gas supply pressure.

B23. The HPFCS of any of paragraphs B20-B22, further comprising a stored hydrogen gas check valve that is configured to permit flow of the stored hydrogen gas to the fuel cell stack when the generated hydrogen gas supply pressure is less than the generated hydrogen gas supply pressure or when the generated hydrogen gas supply pressure is less than a/the threshold pressure differential greater than the stored hydrogen gas supply pressure, and wherein the stored hydrogen gas check valve is configured to restrict flow of the stored hydrogen gas to the fuel cell stack when the generated hydrogen gas supply pressure exceeds the stored hydrogen gas supply pressure or when the generated hydrogen gas supply pressure is or exceeds the threshold pressure differential greater than the stored hydrogen gas supply pressure.

B24. The HPFCS of any of paragraphs B20-B23, wherein the fuel processor is configured to deliver the generated hydrogen gas to a/the buffer tank and to pressurize the buffer tank with the generated hydrogen gas during the startup of the fuel processor, and wherein the generated hydrogen gas supply pressure is a buffer pressure of the generated hydrogen gas in the buffer tank.

B25. The HPFCS of any of paragraphs B1-B24, wherein the HPFCS is configured to utilize a portion of the initial electrical output to facilitate the startup of the fuel processor.

B26. The HPFCS of paragraph B25, when depending from B11, wherein the fuel processing system comprises one or more feed stream pumps configured to flow the one or more feed streams from the one or more feed stream supplies to the fuel processor, and wherein the HPFCS is configured to utilize at least some of the portion of the initial electrical output to power the one or more feed stream pumps to flow the one or more feed streams to the fuel processor during the startup of the fuel processor.

B27. The HPFCS of any of paragraphs B1-B26, wherein the HPFCS is configured to restrict supply of the stored hydrogen gas to the fuel cell stack responsive to the fuel processor reaching the hydrogen-producing state.

B28. The HPFCS of paragraph B27, wherein the HPFCS is configured to restrict the supply of the stored hydrogen gas responsive to the generated hydrogen gas reaching or exceeding a/the threshold pressure differential.

B29. The HPFCS of any of paragraphs B27-B28, wherein the HPFCS is configured to restrict the supply of the stored hydrogen gas to the fuel cell stack responsive to the generated hydrogen gas flow rate exceeding a/the threshold minimum generated hydrogen flow rate.

B30. The HPFCS of any of paragraphs B1-B29, further comprising a stored hydrogen gas pressure detector configured to detect a pressure of the stored hydrogen gas in the hydrogen storage device.

B31. The HPFCS of paragraph B30, wherein the HPFCS is configured to supply the stored hydrogen gas to the fuel cell stack when the pressure of the stored hydrogen gas in the hydrogen storage tank is sufficient to at least partially satisfy the applied load while the fuel processor is in a/the startup.

B32. The HPFCS of any of paragraphs B30-B31, wherein the HPFCS is configured to determine the volume of stored hydrogen gas contained in the hydrogen storage device based on the pressure of the stored hydrogen gas in the hydrogen storage device, wherein the fuel processor is in the startup for a/the threshold startup time, and wherein the HPFCS is configured to supply the stored hydrogen gas to the fuel cell stack when the volume of the stored hydrogen gas contained in the hydrogen storage tank is sufficient to at least partially satisfy the applied load during the threshold startup time.

B33. The HPFCS of any of paragraphs B1-B32, wherein the volume of stored hydrogen gas is at least one of:
(i) at least 100 liters (L), at least 150 L, at least 200 L, at least 250 L, at least 300 L, at least 350 L, at least 400 L, at least 450 L, at least 500 L, at least 600 L, at least 700 L, at least 800 L, at least 900 L, at least 1,000 L, at least 1,500 L, at least 2,000 L, at least 2,500 L, or at least 3,000 L; and
(ii) at most 50,000 L, at most 10,000 L, at most 9,000 L, at most 8,000 L, at most 7,000 L, at most 6,000 L, at most 5,000 L, at most 4,000 L, at most 3,000 L, or at most 2,000 L.

B34. The HPFCS of any of paragraphs B1-B33, further comprising a stored hydrogen gas pressure regulator configured to regulate a/the stored hydrogen gas supply pressure at which the stored hydrogen gas is provided to the fuel cell stack.

B35. The HPFCS of any of paragraphs B1-B34, wherein the initial electrical output is the electrical output produced by the fuel cell stack by reacting the stored hydrogen gas with the oxidant, and wherein the subsequent electrical output is the electrical output produced by the fuel cell stack by reacting the generated hydrogen gas with the oxidant.

B36. The HPFCS of any of paragraphs B1-B35, wherein in an intermediate configuration, the HPFCS is configured to partially satisfy the applied load with the initial electrical output, to partially satisfy the applied load with the subsequent electrical output, and to satisfy the applied load collectively with the initial electrical output and the subsequent electrical output.

B37. The HPFCS of any of paragraphs B1-B7, wherein the HPFCS is configured to satisfy the applied load with the subsequent electrical output when the stored hydrogen gas is no longer being supplied to the fuel cell stack and the generated hydrogen gas is the only hydrogen gas supplied to the fuel cell stack.

B38. The HPFCS of any of paragraphs B1-B37, wherein the applied load is from one or more of the HPFCS and an energy-consuming device.

B39. The HPFCS of any of paragraphs B1-B38, further comprising an electrical energy storage device configured to supply a stored electrical current to at least partially satisfy the applied load.

B40. The HPFCS of paragraph B39, wherein the electrical energy storage device is configured to at least partially satisfy the applied load during a/the threshold initial supply time.

B41. The HPFCS of paragraph B40, wherein the electrical energy storage device comprises an overall energy storage capacity that is sufficient to satisfy the applied load during the threshold initial supply time.

42 The HPFCS of paragraph B41, wherein the overall energy storage capacity of the energy storage device is less than that sufficient to satisfy the applied load during the threshold initial supply time.

B43. The HPFCS of any of paragraphs B41-B42, wherein the energy storage capacity of the electrical energy storage device is at least one of:
at least 5 amps hour (A h), at least 10 A h, at least 15 A h, at least 20 A h, at least 25 A h, at least 30 A h, at least 35 A h, at least 40 A h, at least 45 A h, at least 50 A h, at least 55 A h, or at least 60 A h; and
at most 10 Ah, at most 15 A h, at most 20 A h, at most 25 A h, at most 30 A h, at most 35 A h, at most 40 A h, at most 45 A h, at most 50 A h, at most 55 A h, at most 60 A h, at most 65 A h, at most 70 A h, at most 80 A h, at most 90 A h, or at most 100 A h.

B44. The HPFCS of any of paragraphs B39-B43 wherein the electrical energy storage device includes at least one of:
(i) at least one battery;
(ii) at least one capacitor; and
(iii) at least one super capacitor; and
(iv) at least one flywheel.

B45. The HPFCS of any of paragraphs B39-B44, wherein the electrical energy storage device does not include at least one battery.

B46. The HPFCS of any of paragraphs B1-B45, further comprising a controller configured to receive a detection signal from one or more detectors of the HPFCS and to actuate one or more components of the HPFCS responsive to the receipt of the detection signal from the one or more detectors.

B47. The HPFCS of any of paragraphs B1-B46 configured to perform the methods of any of paragraphs A1-A58.

C1. The use of the methods of any of paragraphs A1-A58 to initiate operation of the HPFCS of any of paragraphs B1-B46.

INDUSTRIAL APPLICABILITY

The methods disclosed herein are applicable to the hydrogen reforming, fuel cell, and backup power industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, when the disclosure, the preceding numbered paragraphs, or subsequently filed claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method of initiating operation of a hydrogen-producing fuel cell system (HPFCS), the method comprising:
   detecting an inability of a primary power source to satisfy an applied load;
   responsive to the detecting, initiating supply of stored hydrogen gas from a hydrogen storage device of the HPFCS to a fuel cell stack of the HPFCS, consuming the stored hydrogen gas with the fuel cell stack to produce an initial electrical output from the fuel cell stack, and utilizing the initial electrical output to initiate startup of a fuel processor of the HPFCS to produce generated hydrogen gas; and
   subsequent to at least a threshold startup time for the fuel processor, initiating supply of generated hydrogen gas from the fuel processor to the fuel cell stack, consuming the generated hydrogen gas with the fuel cell stack to produce a subsequent electrical output from the fuel cell stack, and at least partially satisfying the applied load with the subsequent electrical output.

2. The method of claim 1, wherein the initiating the startup of the fuel processor includes utilizing a portion of the initial electrical output to power one or more components of the fuel processor.

3. The method of claim 2, wherein the one or more components of the fuel processor include one or more of a stored hydrogen gas flow control valve configured to selectively permit flow of the stored hydrogen gas to the fuel cell stack to produce the initial electrical output, an electric heating assembly configured to heat at least the fuel processor of the HPFCS, a pressure regulator of the HPFCS, and a controller of the HPFCS.

4. The method of claim 1, wherein the detecting includes detecting a decrease in a monitored voltage, and wherein the monitored voltage is at least one of:
   (i) a primary voltage of the primary power source configured to provide a primary electric current to the applied load;
   (ii) a grid voltage of an electrical grid configured to provide a grid electric current to the applied load; and
   (iii) an energy storage device voltage of an electrical energy storage device configured to provide stored electrical current to the applied load.

5. The method of claim 1, wherein the applied is from one or more of the HPFCS and an energy-consuming device.

6. The method of claim 1, wherein the initiating the startup of the fuel processor is performed at least partially concurrently with the consuming the stored hydrogen gas with the fuel cell stack to produce the initial electrical output.

7. The method of claim 1, wherein the utilizing the initial electrical output to facilitate the startup of the fuel processor is performed during a startup timeframe that includes the threshold startup time and in which the stored hydrogen gas is the only hydrogen gas provided to the fuel cell stack.

8. The method of claim 1, wherein the method further includes at least partially satisfying the applied load with the initial electrical output.

9. The method of claim 8, wherein the at least partially satisfying the applied load with the initial electrical output includes satisfying the applied load solely with the initial electrical output.

10. The method of claim 1, wherein the method further includes at least partially satisfying the applied load with the initial electrical output within a threshold initial supply time, wherein the initial supply time is less than a threshold fraction of the threshold startup time for the fuel processor, and wherein the threshold fraction is less than 80% of the threshold startup time for the fuel processor.

11. The method of claim 10, wherein the fuel processor is a thermally primed fuel processor, and wherein the method includes maintaining the fuel processor at a thermally primed temperature prior to the detecting.

12. The method of claim 1, wherein the fuel processor is a thermally primed fuel processor, wherein the method further includes maintaining the fuel processor at a thermally primed temperature prior to the detecting, and wherein the initiating the startup of the fuel processor includes heating a reforming region of the fuel processor from the thermally primed temperature to a hydrogen-producing temperature range.

13. The method of claim 1, wherein the initiating the supply of the generated hydrogen gas includes initiating the supply of the generated hydrogen gas responsive to the fuel processor reaching a hydrogen-producing state in which a generated hydrogen gas flow rate of the generated hydrogen gas is sufficient to satisfy the applied load.

14. The method of claim 1, wherein the initiating the supply of the generated hydrogen gas includes initiating the supply of the generated hydrogen gas responsive to a generated hydrogen gas supply pressure of the generated hydrogen gas exceeding a stored hydrogen gas supply pressure at which the stored hydrogen gas is provided to the fuel cell stack.

15. The method of claim 1, wherein the method further includes ceasing the supply of the stored hydrogen gas from the hydrogen storage device to the fuel cell stack, and further wherein the ceasing is at least one of:
   (i) subsequent to the initiating the supply of the generated hydrogen gas; and
   (ii) responsive to the initiating the supply of the generated hydrogen gas.

16. The method of claim 1, wherein the HPFCS further includes an electrical energy storage device configured to selectively provide a stored electrical current to the applied load, wherein the HPFCS includes a stored hydrogen gas flow control valve configured to selectively permit or block flow of the stored hydrogen gas to the fuel cell stack, and wherein the initiating the supply of the stored electrical current comprises utilizing a portion of the stored electrical current to open the stored hydrogen gas flow control valve and permit flow of the stored hydrogen gas to the fuel cell stack.

17. The method of claim 16, wherein, prior to the initiating the supply of the stored hydrogen gas, the method further includes determining that the hydrogen storage device includes hydrogen gas sufficient to provide the stored hydrogen gas to the fuel cell stack for at least the threshold startup time for the fuel processor, and further wherein the method includes not initiating the supply of stored hydrogen gas responsive to a determination that the hydrogen storage device does not include hydrogen gas sufficient to provide the stored hydrogen gas to the fuel cell stack for at least the threshold startup time for the fuel processor.

18. The method of claim 17, wherein, prior to the initiating the supply of the stored hydrogen gas, the method further includes determining that the hydrogen storage device includes at least twice the quantity of hydrogen gas sufficient to provide the stored hydrogen gas to the fuel cell stack for at least the threshold startup time for the fuel processor.

19. A hydrogen-producing fuel cell system (HPFCS), comprising:
a fuel cell stack configured to receive an oxidant and hydrogen gas and to generate an electrical output from the oxidant and hydrogen gas;
a fuel processor configured to receive one or more feed streams and to react the one or more feed streams to produce generated hydrogen gas; and
a hydrogen storage device configured to store a volume of stored hydrogen gas;
wherein the fuel cell stack is configured to at least partially satisfy an applied load with the electrical output when a primary power source that normally is adapted to satisfy the applied load is not providing a primary electrical output to satisfy the applied load, wherein the HPFCS is configured to detect an inability of the primary power source to satisfy the applied load, and wherein responsive to a detection of the inability of the primary power source to satisfy the applied load, the HPFCS is configured to:
supply the stored hydrogen gas to the fuel stack to produce an initial electrical output from the stored hydrogen gas;
utilize at least a portion of the initial electrical output to facilitate a startup of the fuel processor; and
supply the generated hydrogen gas to the fuel cell stack to produce a subsequent electrical output from the generated hydrogen gas when the fuel processor reaches a hydrogen-producing state from the startup and at least partially satisfy the applied load with the subsequent electrical output.

20. The HPFCS of claim 19, wherein the fuel processor produces the generated hydrogen gas with a generated hydrogen gas supply pressure, wherein the generated hydrogen gas supply pressure increases during the startup of the fuel processor, and wherein the fuel processor reaches the hydrogen-producing state when the generated hydrogen gas supply pressure is a threshold pressure differential greater than a stored hydrogen gas supply pressure at which the stored hydrogen gas is supplied to the fuel cell stack.

21. The HPFCS of claim 20, further comprising a generated hydrogen gas check valve configured to selectively permit supply of the generated hydrogen gas to the fuel cell stack when the generated hydrogen gas supply pressure is or exceeds the threshold pressure differential greater than the stored hydrogen gas supply pressure and to prevent flow of the generated hydrogen gas to the fuel cell stack when the generated hydrogen gas supply pressure is less than the threshold pressure differential greater than the stored hydrogen gas supply pressure.

22. The HPFCS of claim 20, wherein the HPFCS is configured to restrict flow of the stored hydrogen gas to the fuel cell stack when the fuel processor reaches the hydrogen-producing state, wherein the HPFCS further comprises a stored hydrogen gas check valve that is configured to permit flow of the stored hydrogen gas to the fuel cell stack when the generated hydrogen gas supply pressure is less than the threshold pressure differential greater than the stored hydrogen gas supply pressure, and wherein the stored hydrogen gas check valve is configured to restrict flow of the stored hydrogen gas to the fuel cell stack when the generated hydrogen gas supply pressure is or exceeds the threshold pressure differential greater than the stored hydrogen gas supply pressure.

23. The HPFCS of claim 19, further comprising an electrical energy storage device configured to supply a stored electrical current to at least partially satisfy the applied load, wherein the HPFCS is configured to produce the initial electrical output from the stored hydrogen gas within a threshold initial supply time from the detection of the inability of the primary power source to satisfy the applied load, wherein the HPFCS is configured to produce the subsequent electrical output from the generated hydrogen gas within at least a threshold startup time from the detection of the inability of the primary power source to satisfy the applied load, wherein an energy storage capacity of the electrical energy storage device is sufficient to satisfy the applied load during the threshold initial supply time, and wherein the energy storage capacity of the electrical energy storage device is less than that sufficient to satisfy the applied load during the threshold initial supply time.

* * * * *

UNITED STATES PATENT AND TRADEMARK OFFICE
CERTIFICATE OF CORRECTION

PATENT NO. : 11,831,051 B2
APPLICATION NO. : 17/727589
DATED : November 28, 2023
INVENTOR(S) : Harol Koyama, Michael Tyler Hicks and Kevin C. Desrosiers It is certified that error appears in the above-identified patent and that said Letters Patent is hereby corrected as shown below:

In the Claims

In Claim 5, Column 45, Line 53, please insert the word --load-- between the words "applied" and "is".

Signed and Sealed this
Twenty-third Day of January, 2024

*Katherine Kelly Vidal*

Katherine Kelly Vidal
*Director of the United States Patent and Trademark Office*